(12) United States Patent
Tagg et al.

(10) Patent No.: US 9,113,308 B2
(45) Date of Patent: Aug. 18, 2015

(54) SUBSCRIBER IDENTIFICATION MANAGEMENT BROKER FOR FIXED/MOBILE NETWORKS

(71) Applicant: Tru-Phone Limited, London (GB)

(72) Inventors: James Peter Tagg, Kent (GB); Edward Thomas Guy, III, Chatham, NJ (US); Timothy Paul Evans, Berkshire (GB); Robert Snijder, Wetzikon (CH); Igor Borisoglebski, Alcabideche (PT); Alistair James Campbell, Edenbridge (GB); Claudio Sequeria, Seixal (PT)

(73) Assignee: Truphone Limited (GB)

( * ) Notice: Subject to any disclaimer, the term of this patent is extended or adjusted under 35 U.S.C. 154(b) by 2 days.

(21) Appl. No.: 13/779,094

(22) Filed: Feb. 27, 2013

(65) Prior Publication Data
US 2014/0031035 A1    Jan. 30, 2014

Related U.S. Application Data

(63) Continuation of application No. 13/497,748, filed on Jul. 26, 2012, now Pat. No. 8,406,758.

(51) Int. Cl.
| | |
|---|---|
| *H04W 4/00* | (2009.01) |
| *H04W 8/04* | (2009.01) |
| *H04W 8/18* | (2009.01) |
| *H04W 8/24* | (2009.01) |
| *H04W 60/00* | (2009.01) |
| *H04W 60/06* | (2009.01) |

(52) U.S. Cl.
CPC *H04W 8/04* (2013.01); *H04W 8/18* (2013.01); *H04W 8/245* (2013.01); *H04W 60/005* (2013.01); *H04W 60/06* (2013.01)

(58) Field of Classification Search
CPC ........ H04W 60/00; H04W 48/18; H04W 8/02
USPC ........ 455/432.1, 433, 435.1–435.3, 466, 406, 455/422.1, 434, 168.1, 456.1–456.3; 370/328–329
See application file for complete search history.

(56) References Cited

U.S. PATENT DOCUMENTS

| | | | | |
|---|---|---|---|---|
| 5,974,328 | A  * | 10/1999 | Lee et al. | 455/456.3 |
| 2002/0197991 | A1 * | 12/2002 | Anvekar et al. | 455/432 |
| 2004/0176092 | A1 * | 9/2004 | Heutschi | 455/435.1 |
| 2004/0205158 | A1 * | 10/2004 | Hsu | 709/218 |
| 2005/0070278 | A1 * | 3/2005 | Jiang | 455/432.3 |
| 2005/0107038 | A1 * | 5/2005 | Coutts | 455/41.2 |
| 2005/0107109 | A1 * | 5/2005 | Gunaratnam et al. | 455/525 |

(Continued)

*Primary Examiner* — Nathan Taylor

(57) ABSTRACT

The present invention relates to a method for managing the automatic provision of a subscriber network identifier from a central network server to a subscribed communication device, the method comprising receiving notification at the central server relating to a change in the current location for the subscribed device, and determining from the notification whether a new subscriber network identifier is to be provisioned from the central server. The method further comprises selecting a subscriber network identifier on the basis of the current location, if the determining step has determined that a new subscriber network identifier is to be provisioned, and outputting the selected subscriber network identifier for transmission to the subscribed device. The present invention also relates to managing the automatic connection of a subscribed communication device to a network, where a preferred network and preferred subscriber network identifier may be used.

8 Claims, 18 Drawing Sheets

(56) References Cited

U.S. PATENT DOCUMENTS

| | | | |
|---|---|---|---|
| 2005/0181734 A1* | 8/2005 | Coutts et al. | 455/67.16 |
| 2005/0260973 A1* | 11/2005 | van de Groenendaal | 455/411 |
| 2006/0094423 A1* | 5/2006 | Sharma et al. | 455/433 |
| 2006/0276226 A1* | 12/2006 | Jiang | 455/558 |
| 2007/0099632 A1* | 5/2007 | Choksi | 455/456.1 |
| 2007/0178933 A1* | 8/2007 | Nelson | 455/550.1 |
| 2008/0004014 A1* | 1/2008 | Palviainen | 455/435.1 |
| 2008/0293408 A1* | 11/2008 | Jiang | 455/433 |
| 2008/0311907 A1* | 12/2008 | Watson et al. | 455/435.1 |
| 2009/0029684 A1* | 1/2009 | Rosenblatt et al. | 455/414.1 |
| 2009/0264122 A1* | 10/2009 | Van Loon et al. | 455/433 |
| 2009/0325558 A1* | 12/2009 | Pridmore et al. | 455/415 |
| 2010/0075668 A1* | 3/2010 | Pan | 455/433 |
| 2010/0159924 A1* | 6/2010 | Lagerman et al. | 455/433 |
| 2010/0290424 A1* | 11/2010 | Collingrige | 370/329 |
| 2014/0031035 A1* | 1/2014 | Tagg et al. | 455/433 |

* cited by examiner

SUBSCRIBER IDENTIFICATION MANAGEMENT BROKER FOR FIXED/MOBILE NETWORKS

FIELD OF THE INVENTION

The invention relates to the management of subscriber identification in communication networks. Specifically, the invention has particular application in the management of identities for users who are customers of one or more home networks while they roam between multiple visited networks. In one embodiment, the invention keeps track of the subscriber's network identifiers and can switch between practical identifiers without losing track of the primary customer identity. The primary customer identity is usually a unique human being but can be a machine or sometimes a company entity such as a department. The identifiers are commonly the customers IMSI (International Mobile Subscriber Identity) that resides on a SIM (Subscriber Identity Module) or their telephone number MSISDN (Mobile Subscriber Integrated Services Digital Network Number) or other important identities such as MAC (Media Access Control) address, IP address, email address and IMEI (International Mobile Equipment Identity).

BACKGROUND ART

The three most commonly used networks in the world are The Internet, the Mobile Network and the Fixed Telephony Network and since these networks are essentially linked by a variety of gateways, they form the largest single 'machine' on the planet. Subscribers roam on these networks and connect at a variety of points using credentials. These credentials are either stored in Smartcards such as SIMs, on the devices themselves or in the subscribers' head as 'passwords'. When a subscriber moves to a new portion of the network they must first identify themselves to that network and then gain access to that network using an authentication mechanism.

Patent Tagg WO 02/057869 described a method for users to connect to different portions of the Internet through a form of co-operative networking. This invention relates to a network mediated method for connecting to predominantly Mobile Networks.

In the GSM (Global System for Mobile communication) authentication is performed using a SIM inserted into the mobile communications device. This manages the connection to the network and contains the network subscriber keys. There are two types of authentication—home authentication and roaming authentication. Home authentication is straightforward and simply requires the exchange of a key with the home network to prove the subscribed user's identity. When the subscribed user is connected to the home network it is relatively straightforward to obtain the key, check it against the central database and then grant the subscribed user access to that network while keeping track of their usage for billing or credit management purposes. Typically, customers register to a network in a home location such as a country, state or region. This home location holds the primary record of that customer (subscribed user) and maintains the billing relationship with them. The home location usually maintains a record of the person's actual identity to allow for law enforcement activities, post pay billing and the like. In the case where the communications device is connected to a foreign network this process is more complex and is referred to as roaming.

'Roaming' refers to extending the connectivity of a service to a location that is different from a home location. When a mobile communications device, such as a mobile telephone, travels with a user outside of their home operator coverage area—'territory'—the device can still access services using roaming mechanisms/services. However, there are a growing number of people who live in more than one home and, of course, machines such as airplanes and cars don't have a 'home' in the human sense of the word.

There are a growing number of internationally mobile people who spend significant time in more than one country. The International Air Transport Association (IATA) projects that by 2011 global airlines will be handling 2.75 billion passengers per year (up by 620 million from 2006). As a result of the number of internationally mobile people, it is expected that the number of people relying on mobile phones and similar mobile communications devices will increase accordingly. Informa Telecoms & Media statistics show international roaming significantly increasing, with European outbound roamers expected to increase from 131 m to 520 m (+397%) by 2010. Additionally significant growth is occurring in machine to machine communication where a SIM may be used for tracking consignments and merchantable goods and assets.

Users are poorly served by current systems, which were designed before the surge in international travel and are designed to handle customers who typically lived in one home and who very infrequently travelled away from that home. Users of cellular radio telephone services are familiar with the roaming surcharges levied for usage of a terminal device, typically a mobile phone, in a foreign network. In this sense a foreign network simply means a network other than the home network that the user originally subscribed to. Even the name 'roaming surcharge' belies the original network design which was for exceptional behaviour. However, roaming is now extremely common.

There are few options available to users when travelling to a foreign country which help reduce these surcharges:—

One option for a user is to purchase a plurality of additional pre-pay subscriber identification modules (SIMs), one for each territory which the user visits. A SIM is a plastic card with embedded electronic circuitry, which has a unique serial number and a unique international number for the mobile user (IMSI). The SIM enables communication between the mobile device and available cellular networks. Therefore, by purchasing a plurality of different SIMs,—one for each territory—the user is able to replace the original SIM with an appropriate SIM for the territory being visited. In this way, the mobile device appears to be a subscriber on the foreign network, which means the user can make and receive calls or use data services without incurring roaming surcharges.

This option has many disadvantages:
  the user must purchase and carry around a plurality of different SIM cards;
  the user must ensure that there is sufficient credit in the accounts linked with each SIM card. Furthermore, it is not desirable to have unused credit on a number of different networks, as this credit may be wasted without being redeemed;
  The act of maintaining a plurality of different SIM accounts is cumbersome and time consuming, involving considerable user interaction;
  When the Subscriber swaps SIM their mobile number changes this means they are no longer reachable on their normally used number. Further if they make an outbound call their Caller Line Identifier (CLI) will be a new one and therefore unknown to the receiver. This may result in the called party refusing to answer that call as the do not recognise the caller.

Law enforcement agencies are frustrated in their endeavours to keep track of undesirable people as they effectively have to keep track of multiple copies of the same person.

Another option to reduce roaming charges is to use a service, such as the one described in Brunnekreef WO2006002951, where the user (or an application) on the mobile phone can pre-pend a (sometimes hidden) telephone number of an intermediate service that will accept the user's call, remove the pre-pended information and call the desired destination number. The caller then drops the call automatically and awaits a call-back. The intermediate service calls the user back to complete the connection, and this may give the user better calling rates than normal roaming surcharges. This has the disadvantage of introducing a delay in the communication channel while the user is trying to contact another party. Furthermore, the user gets a very poor user experience due to handset software compatibility issues: depending on the model of the mobile phone, the phone may appear to 'do nothing' until it gets the call back, strange messages such as 'call failed' or 'call blocked' may appear or the service may not work at all.

Multi-IMSI SIMs are available that offer the capability of being pre-programmed with a plurality of mobile subscriber data sets. The data sets are sometimes incorrectly referred to as IMSIs, hence the name 'multi-IMSI SIM', but are actually data sets which each comprise an international mobile subscriber identity (IMSI) and other network-related data.

These SIMS have processing capability and an algorithm to present the correct set of data to the phone based on the location of that phone. This allows the phone to present as a 'local' subscriber to the network in question. The problems associated with this algorithmic system include:

When a SIM is pre-programmed with fixed set of IMSIs, new SIMs need to be issued if additional IMSIs become available (likewise for deletion). Therefore, the physical management of the SIMs is very complex.

SIMs contain a preference table which list networks for which a suitable IMSI is available. These lists of preferences can change over time and the SIM will rapidly become out-of-date with respect to the reality of the network. This could result in roaming charges which are less favourable for the user.

While this option may provide a means to originate mobile calls at a local rate each network is independent of the other and the subscriber effectively becomes a different person on each network. In order for the subscriber to remain in contact with people from their home network the subscriber must either (i) forward calls from their home country telephone service to their current visited country's telephone service, (ii) inform their expected callers of their new number, or (iii) frequently check voicemail and missed calls in order to communicate with callers. This again is cumbersome and time consuming for the user.

Many fixed format Dual and Multiple IMSI SIM systems have been sold by companies such a as VeriSign™, Gemalto™ and these are described in various patent applications such as Cammileri (WO2007102003), Stadelmann (WO9955107), Salomon (WO0221872), Bongers (WO0049820). In such systems, a piece of software runs in the SIM or on the handset or a separate electronic module and makes decisions as to which IMSI to use given the location and available networks. Such systems are sometimes called SmartSIMs, but in fact this is a misnomer as all SIMs are smart and contain a microprocessor and memory to run network selection and authentication programs. In addition to the physical problems of SIM management described above, there is a range of more subtle operational problems inherent in using a SIM algorithm and a table of IMSIs to effect a roaming solution:

One problem is that the algorithm must run in conjunction with information obtained from the handset and although theoretically all handsets conform with certain operating standards, in practice the implementation of such algorithms are highly incompatible. Therefore, SIM algorithm systems often fail to operate correctly in common handset models. These failures include:

Random crashes;

Simple failure to perform the function; and

User messages that appear to make no sense.

In addition, the SIM algorithm often has a lack of information about the network in which it runs and this can cause it to continuously hunt for an optimum network. During this time the handset may not reliably make and receive calls and the handset runs at full power, which can rapidly drain the battery.

If the algorithm pre-pends an access number this access number cannot be practically modified on a call by call basis and so call routing will not be optimized.

The SIM does not have enough knowledge of the network geography and current commercial status to choose the best network.

Such SIMs are essentially a fire and forget system. If the SIM locks onto the wrong network due to either a change in the network or a bug in the SIM, it may be lost for ever to the home network.

If the SIM connects to a network for which pre-pay control is not available then the SIM may be locked into a state where unlimited charges are permitted.

IMSI swapping to a foreign network renders the users normal value added services inoperable as the home network is now blind to the user. Services such as short codes, top-up numbers, voicemail and other convenience services no longer work in the expected way.

Another problem travellers experience as they travel near country or region borders is that mobile phones may inadvertently attach to a foreign network, even though they may be physically in a home territory. Under normal operation, once a handset (i.e. a mobile phone) is attached to a network, it remains attached to it until signal is lost or if the subscriber manually disconnects. As a result, the user is charged high roaming charges for an extended period even if though they were physically in their home territory. In some regions such as Canada, USA and India where there is national roaming this effect can lead to accidentally high bills even when the customer is not travelling at all.

SUMMARY OF INVENTION

According to a first aspect of the present invention there is provided a method for managing the automatic provision of a subscriber network identifier from a central network server to a subscribed communication device, the method comprising receiving notification at the central server relating to a change in the current location for the subscribed device, determining from the notification whether a new subscriber network identifier is to be provisioned from the central server, selecting a subscriber network identifier on the basis of the current location, if the determining step has determined that a new subscriber network identifier is to be provisioned, and outputting the selected subscriber network identifier for transmission to the subscribed device.

Conveniently, the subscriber network identifier is an International Mobile Subscriber Identity (IMSI). Preferably, the IMSI is packaged with other data such as security keys and routing information and is stored as a data record on a Subscriber Identity Module (SIM) within the subscribed communications device.

The present invention advantageously manages a multiplicity of IMSIs on a single SIM in use in one handset and can dynamically retrieve a local IMSI from the host portion of the system if a suitable one is not already on the handset. It also manages the telephone numbers associated with a given subscriber allocated with multiple IMSIs, the network connection preference tables, the routing of calls, subscriber billing and credit management. We shall refer to this inventive concept as the 'IMSI Broker', which is typically incorporated into a typical MNO, MVNO or MVNE architecture.

Using the present invention advantageously enables a mobile phone user, subscribed to the service or network providing the service, to roam from network to network and to be automatically configured and connected to roamed-to networks as a local user. This effectively eliminates roaming charges and therefore reduces the cost of mobile telephone calls and data usage to much lower levels than was previously practically possible.

It is possible to identify the roamed-to network using the Mobile Country Code (MCC) and Mobile Network Code (MNC) (as defined by ITU-T Recommendation E.212)). Therefore, by performing a lookup in the HLR database it is possible to determine if a subscriber has already been allocated an IMSI for use in the detected network.

Another advantage is that subscribers do not need to set up new accounts or pre-pay to multiple network operators as the system is capable of merging all the billing relationships into one single account.

This present invention provides the ability for a single person or machine to be allowed to have multiple network homes while maintaining a single customer record, billing relationship and unique binding to their personal or machine identity.

Preferably, the receiving step comprises receiving a notification from an HLR scanner, the HLR scanner being arranged to detect a location update message received by a Home Location Register (HLR) to which the subscribed device is subscribed, the location update message corresponding to the change in current location of the subscribed device.

Advantageously, the HLR always knows under which IMSI a customer (subscribed user) is attached to the network and takes care that the mapping of the different numbers a customer is using happens correctly. A customer can receive calls and text messages on each of his/her numbers wherever he/she is.

In an embodiment, the HLR is not associated with a specific physical network infrastructure for radio communication with subscribed devices. In this case, there is no concept of a home network and all physical radio networks have equal status in the hierarchy. The effect is that all customer IMSIs can be treated equally and any IMSI can be selected as a master IMSI or all IMSI can be peers of each other. This contrasts with many existing design patterns where one IMSI is the home/master IMSI and must always be returned to from time to time for the purposes of updating settings, resolving billing issues and determining customer ownership in a KYC solution. A key benefit of having no single master/home IMSI is that the system can be set in a multi-home mode where any IMSI can be used for the above purposes. Alternatively all IMSI can be peers and there is no master IMSI whatsoever. In this scenario when a device loses contact with its base it will search all IMSIs in order to re-contact the HLR.

In a method preferred embodiment, the method facilitates a network server based call processor heuristically selecting an telephone number (MSISDN) from a set of telephone numbers assigned to the subscriber. The selection is based on the number which is most suitable for the called party such that the called party can identify the subscriber. This advantageously avoids the situation where a call is unanswered because the called party does not know who is calling. These invention functions facilitate the use of one or more numbers on one phone on many GSM networks around the world in a cost-effective manner.

Optionally, the receiving step comprises receiving a communications message from the subscribed communications device indicating a change in current location.

In a preferred embodiment, the determining step comprises retrieving an IMSI list from the HLR for the subscribed device, the IMSI list comprising all of the IMSIs which are allocated to the subscribed device, and determining if the IMSI list comprises an IMSI which is appropriate for the current location of the subscribed device.

Typically, the selecting step comprises obtaining a local IMSI from an IMSI pool comprising a plurality of IMSIs for different locations, the local IMSI being selected from a sub pool of IMSIs suitable for the current location.

Selecting a local IMSI is advantageous as it enables the best possible IMSI to be provided to avoid roaming charges. In this sense, it is possible to provide a local, regional IMSI (with national roaming rights to avoid or minimise the roaming charges for incoming calls.

In other embodiments, the step of determining whether an IMSI is appropriate is based on previously determined preferences for the subscribed device. These may be based on location or cost considerations, but also on other criteria such as network compatibility with a specific handset, or network performance. The preferences may either be set wholly within the IMSI table in the SIM or alternatively the preferences may be held on the network and the SIM may be instructed as to which IMSI it switches to.

This server instruction to change IMSIs is referred to as a 'kick'. The benefit of using server initiated IMSI switching is that much more information is known to the server about the current state of networks, costs and the location of the user, than is known to the software running in the SIM. The ability to switch IMSIs under software control should be done in conjunction with the understanding that the SIM needs to be able to re-contact the HLR through execution of an emergency reconnect process as mentioned above in connection with Multi-homing To be clear if a SIM is instructed by the network—kicked—onto a different IMSI and after a period of time (about 5 minutes) is unable to connect it must rescan all its IMSIs in order to reconnect with the HLR.

When the IMSI has been chosen and has connected to the HLR and the HLR confirms that this is a reliable link either through an active acknowledgement or simply no objection being raised after a period of time then the SIM should signal to the device and other applications running on the SIM that there has been an a change and other applications should behave appropriately. For example upon SIM swap and a period of stability of 3 minutes the SIM could signal to all companion applications on the SIM that the IMSI is now stable and other applications could report information or log into system.

Preferably, the outputting step comprises outputting the local IMSI to an OTA module for transmission to the subscribed device.

In a preferred embodiment, the outputting step further comprises outputting a set of rules concerning when the local IMSI is to be used by the subscribed device.

Optionally, the outputting step further comprises outputting a corresponding MSISDN for the selected IMSI. Another advantage is that the system can manage the telephone number allocation so that it is possible to maintain a single telephone number for a subscriber even though the usage of multiple IMSIs means that the subscriber is actually using multiple actual telephone numbers.

Preferably, the method further comprises updating the HLR when the local IMSI has been provisioned to the subscribed device.

In a preferred embodiment, the method further comprises obtaining a preferred caller line identification (CLI) from a database containing a plurality of CLIs for the subscribed device; and outputting the preferred CLI for use in completing communication channel set-up.

When making calls or sending texts, the present invention advantageously ensures that the called party sees a local number (where available). This lowers the barriers to call back and increases traffic and Average Revenue Per User (ARPU).

Furthermore, as global travellers and callers originate phone calls to others around the world, the appearance of local presence is desired in order to facilitate business marketing as well as national-rate return calls from that locale.

Use of these approaches allow new customisation possibilities for the customer. In embodiments, different supplementary services (such as CLIP, CLIR and call forwarding) may be associated with different subscriber network identifiers. This allows a customer to develop different service profiles for different subscriber network identifiers.

In some cases, it is desirable to maintain customer identity across multiple subscription network identifiers in communication with third parties. This is particularly desirable for access to data services—in embodiments, means are provided to enable access to data services consistently for some or all subscription network identifiers for the subscribed device. In other areas—such as satisfying Know Your Customer requirements—it is desirable to provide evidence of a subscriber's set of identities to a third party.

According to a second aspect of the invention there is provided a central network server for managing the automatic provision of a subscriber network identifier to a subscribed communication device, the server comprising a receiver arranged to receive notification relating to a change in the current location for the subscribed device, an identification checker arranged to determine from the notification whether a new subscriber network identifier is to be provisioned from the server, an identification updater arranged to select a subscriber network identifier on the basis of the current location, if the determining step has determined that a new subscriber network identifier is to be provisioned, and an output module arranged to output the selected subscriber network identifier for transmission to the subscribed device.

According to a third aspect of the invention there is provided a method of connecting to a preferred network at a communication device, the method comprising: providing notification to a central server relating to a change in the current location for the communication device; receiving a subscriber network identifier for a preferred network from the central server on the basis of the current location, if the central server has determined that the communication device is not connected to the preferred network; and disconnecting from a current network connection and reconnecting to the preferred network using the receive subscriber network identifier. Thus the central server has so-to-speak 'kicked' the SIM off one network and onto another.

According to a fourth aspect of the invention there is provided a communication device comprising: storage means for storing a list of subscriber network identifiers; processing means for determining, where a new network connection is required, which subscriber network identifier to use to make the new network connection according to selection rules stored in the storage means; and means to accept update information over a network connection, wherein the communication device operates on received update information to update the list of subscriber network identifiers and the selection rules.

Preferably, the communication device is adapted, on receipt of update information, to break an existing network connection and to make a new network connection in accordance with updated selection rules.

According to a fifth aspect of the invention there is provided a method for managing the automatic connection of a subscribed communication device to an available network, the method comprising determining a current location for the subscribed communication device, retrieving a list of available networks for that current location, selecting a preferred network from the list of available networks, and outputting an instruction for the subscribed mobile device to connect to the preferred network.

In a preferred embodiment the method further comprises monitoring location updates for the subscribed communication device, determining if current network is preferred network, on the basis of network selection rules.

Preferably, the method further comprises instructing the subscribed communication device to disconnect from current network if determined to be not the preferred network, instructing the subscribed communication device to reconnect to the preferred network.

In one embodiment, the determining step may comprise determining the current location on the basis of the physical location of the subscribed communication device as determined using global positioning systems.

Optionally, the determining step comprises determining the current location on the basis of the one or more of the group comprising: Network Country/Operator ID; GSM (Cellular) Cell ID; WiFi access point ID; and other fixed radio network location identifiers.

In a preferred embodiment, the selecting step comprises selecting a preferred theoretical network from the master list of networks known to be available in a certain locality of the current location.

In another preferred embodiment, the selecting step comprises selecting a preferred (available) network on the basis of the networks which the subscribed communication device determines are currently available.

Optionally, the method may be carried out on the subscribed communication device, the method further comprising receiving an updated master list of networks from the central server.

The present invention extends selecting a subscriber network identifier according to the first aspect on the basis of the preferred network and the current location as determined according to the third aspect.

Advantageously, the present invention uses various rules to attach, using the most favourable IMSI, to the most favourable network in the area. In addition, the method recognises when a subscriber is not attached to a preferred network and is able to instruct the subscribed communications device to automatically detach from the current network and to either attach to an available known more favourable network, or seek connection to a known more favourable network.

According to yet another aspect of the present invention there is provided a method for automatically managing an updatable subscriber network identifier (IMSI) in a subscribed communication device, the method comprising: determining when connecting to a current network whether the current subscriber network identifier is local to the current network; replacing the updatable subscriber network identifier with a stored subscriber network identifier, if the stored subscriber network identifier is local to the current network; and disconnecting from network; and subsequently reconnecting using the updated updatable subscriber network identifier.

Preferably, the subscriber network identifier is an IMSI, and the stored subscriber network identifier is one of a plurality of IMSIs stored on a SIM in the subscribed communication device. The selection of an IMSI from the plurality of IMSIs stored on the SIM may be governed by IMSI selection rules which are stored on the SIM or the subscribed communication device. The IMSI selection rules may be updated by receiving an updating message from a central server which is arranged to manage the provision IMSIs to the subscribed communication device.

Optionally, the subscribed communication device may request a new IMSI to be stored on the SIM if the method determines that the SIM does not contain an IMSI which is local to the current network.

In a preferred embodiment, one or more of the plurality of IMSIs may be overwritten if the number of IMSIs stored in the SIM reaches an upper limit.

Preferably, the method further comprises selecting a preferred network on the basis of current location. This may be achieved though a preferred network list which is stored within the SIM or on the subscribed communication device. The preferred network list may be updated by receiving an updating message from a central server which is arranged to manage the automatic connection of subscribed communication device to preferred networks.

In general, the ability to automatically provision additional IMSIs which are local to a user's current location is highly advantageous as is means that the user is able to take advantage of lower call rates without having to carry and maintain a plurality of different SIMs for each territory (country, region or network). In some cases, mobile phones are prevented from using multiple SIMs, and so the present invention is compatible with those cases.

In addition, the amount of user interaction with the functionality of the present invention is far lower than some of the prior art techniques. The methods described herein may operate without the user being made aware of them, and so this is a far improved solution.

In addition, as result of linking several IMSIs to one user, it is possible for law enforcement agencies to keep track of certain individuals who may be connected with criminal activities. This linking may also be useful in assisting network operators maintain records for 'Know Your Customer' legal requirement purposes.

As described in detail later, it is possible to update IMSI selection rules and network selection rules which are stored on the SIM or mobile phone. The updating of such information requires minimal data transfer, and as such, it quick and uses minimal bandwidth. In particular, the ability to provision new IMSIs to mobile phones is bandwidth efficient as it may be possible to include all of the data necessary in a single SMS or a modified SMS. This solution is an improvement on all of the prior art systems described above, which suffer from numerous problems as listed.

The ability to update SIMs/mobile phones over the air in the manner of the present invention has previously not possible because of the quantity of data which is involved. The present inventors have devised a method which minimises the data transfer in order to facilitate a service where the mobile device can operate using a suitable IMSI and preferred network, in order to avoid or reduce roaming charges.

DETAILED DESCRIPTION OF PREFERRED EMBODIMENTS

Figure 1:
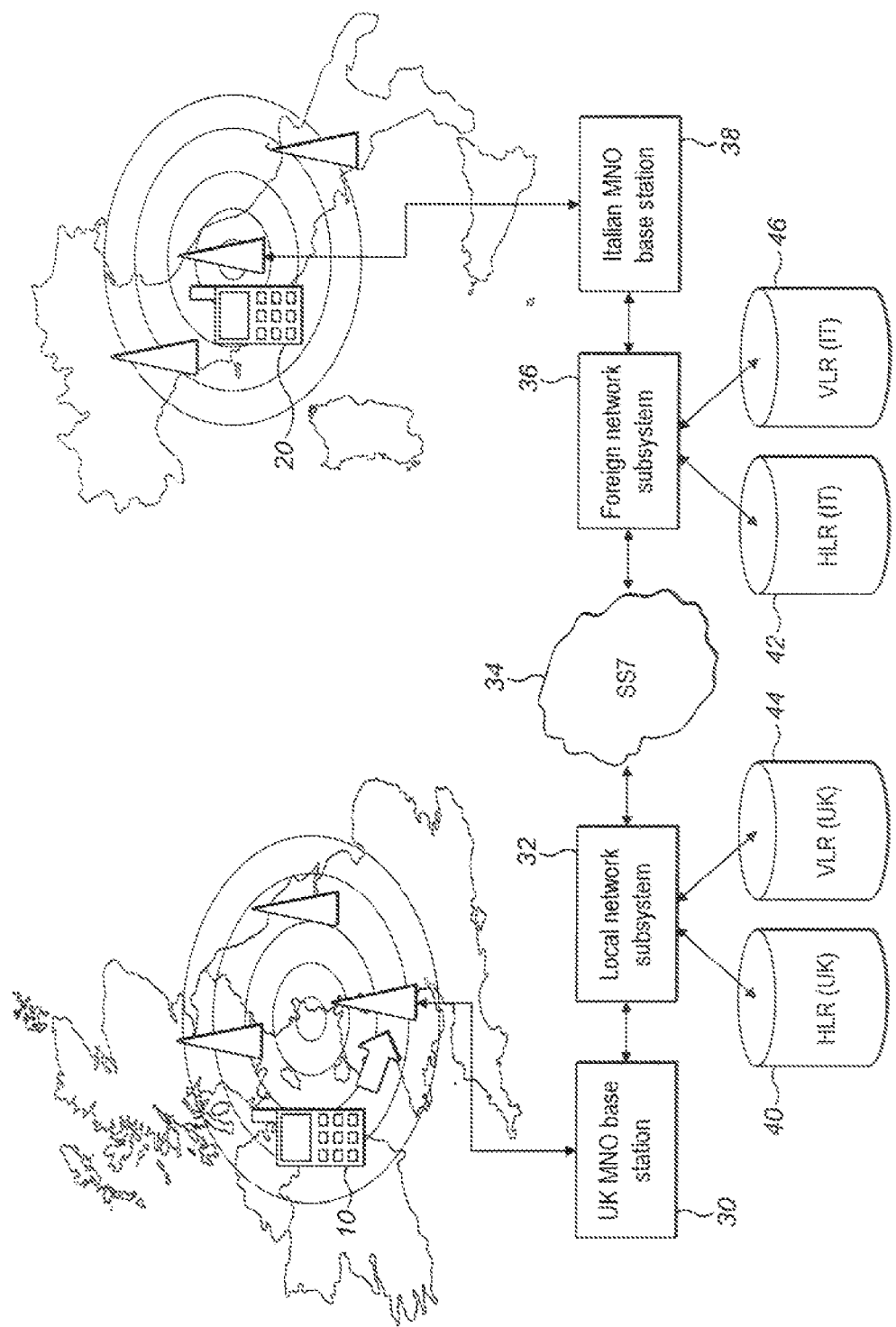
FIG. 1 is an overview of the communications system in which the present invention is operating.

FIG. 1 (Prior Art) is a schematic representation of two cellular telecommunications networks, one in the UK and one in Italy. In reality there are many more Mobile Network Operators (MNO), Mobile Virtual Network Operators (MVNO) or Mobile Virtual Network Enablers (MVNE), and as such many more cellular telecommunications networks. However, FIG. 1 represents only two networks for simplicity.

When a first user makes a call from a first mobile phone 10 in the first user's local network, for example, in the UK, to a second user 20 in a foreign network (i.e. Italy), the call is routed through the local network's base station subsystem (BSS) 30 to a local network switching subsystem (local-NSS) 32, the call is then routed through the Signaling System Number 7 (SS7) 34 network to the foreign network, and through a foreign network switching subsystem (foreign-NSS) 36 to the foreign network's base station subsystem 38. The call is finally routed to the second user's mobile phone 20. Calls in the opposite direction are routed in the same way, through the foreign network's base station subsystem, to the foreign network switching subsystem 36, through SS7 34 to the local network switching subsystem (local-NSS) 32, on to the local network's base station subsystem (BSS) 30, and finally to the first mobile phone 10.

The way that the call is routed to the correct recipient is through a plurality of location registers which form part of the network subsystems. For every user registered in a particular cellular telecommunications network, there is a record held in that network's Home Location Register (HLR) 40, 42. The HLR 40,42 is a central database that contains details of each mobile phone subscriber that is authorized to use that particular network.

The HLR stores details of every Subscriber Identity Module (SIM) card issued by the mobile phone operator (i.e. MNO, MVNO or MVNE). A SIM is a plastic card with embedded electronic circuitry, which is inserted into the mobile phone. Each SIM has a unique identifier called an International Mobile Subscriber Identity (IMSI) which is a primary key to each HLR record. IMSIs are used in any mobile network that interconnects with other networks, including CDMA and EVDO networks as well as GSM networks.

An IMSI is usually 15 digits long, but there are some exceptions. Typically the first 3 digits are the Mobile Country Code (MCC), followed by the Mobile Network Code (MNC), (either 2 digits (European standard) or 3 digits (North American standard)). The remaining digits contain a mobile station identification number (MSIN) within the networks customer base.

SIMs also comprise one or more MSISDNs, which are the telephone numbers used by mobile phones to make and receive calls. Each MSISDN is also a primary key to the HLR record.

In summary, there is a relationship between the HLR, MSISDN, IMSI, and the SIM. The SIM is the physical device which contains a record of the IMSI. The MSISDN is the unique number identifying the mobile phone. The IMSI is the unique identifier of the user subscribing to the network, and the HLR is the system that maps MSISDNs to IMSIs and vice versa.

The above holds true when a user 'roams' away from their home/local network to a foreign network also called a roamed-to network. However, when a mobile phone attempts to connect to a network which is not the home/local network, the roamed-to network communications with the home network in order to verify whether the mobile phone is authorised to use the roamed-to network. This communication is possible because there are reciprocal agreements between many of the available network operators.

When a user roams away from their home service and into an area served by another operator, messages are exchanged over the SS7 network and the roamed-to network operator obtains information from the home network's HLR and creates a temporary record for the subscriber in its Visitor Location Register (VLR) 44, 46. The VLR is a database which is maintained by a network operator (in the same way as the HLR is maintained). However, the VLR contains temporary information about mobile users that are currently located within the service area of (and connected to the network operator), but who are subscribed with an HLR of a different operator elsewhere. When calls are made from the mobile phone, the VLR is checked for authorisation, and assuming authorisation is permitted, the Mobile Switching Center (MSC) permits tracking of the use of the mobile phone for billing purposes. The HLR subscriber profile (i.e. which services are allowed) is downloaded to the VLR when subscribed user registers on (connects to) the network (same for roaming and home network). All call handling and billing related call data record (CDR) generation is done by the MSC—the HLR/VLR is not involved.

So using the example in FIG. 1, a user subscribed to a mobile network operator in the UK visits Italy. When the user arrives in Italy and turns on the mobile phone, the mobile phone will try to connect to an available Italian network operator 36. The Italian network operator can identify from the IMSI number stored in the SIM card that the user is not subscribed to the Italian network, and as such, will contact the user's home network 32 in the UK to verify whether the user is authorised to use the Italian network.

The VLR 46 updates the HLR 40 in the UK, with location information over SS7 with a Location Update message (LU). The LU message is routed to the HLR(UK) based on the global title translation of the IMSI that is contained in a Signalling Connection Control Part (SCCP) field of the LU. The HLR(UK) informs the VLR(IT) as to the status of the subscriber and whether service is to be provided in the roamed-to network, i.e. the Italian network. If the user is authorised, the Italian network generates a temporary record for the user in the Italian VLR 46.

As described above, there are problems associated with roaming services in that users connected to a roamed-to network incur heavy surcharges when making or receiving calls or using data services on their mobile phones. This is true regardless of where the user is calling, or who is calling the user. In the above example, the user visiting Italy will incur roaming charges when calling local Italian phone numbers as well as calling phones in the home network in the UK and elsewhere. Similarly, roaming charges will be applied to incoming calls from either UK, Italian or other phone numbers.

The prior art methods for reducing these roaming charges are cumbersome as they require the user to purchase, carry around, and maintain the accounts of, many different SIM cards, or they require a high degree of user interaction in order to utilise one of the services to circumvent these roaming charges. However, as described above there are many known problems with these services.

One aspect of the present invention resides in the integration of an additional central server within a typical cellular telecommunications network. The additional central server is able to provide, as required, a plurality of additional IMSIs to a mobile phone, when the mobile phone is connected to a roamed-to network in another country/region. The additional central server is referred to as an IMSI Broker.

In one embodiment of the invention, the IMSI Broker is arranged to determine whether the SIM card in the mobile phone has an appropriate IMSI for the roamed-to network. The SIM cards required for this embodiment of the invention are capable of storing a plurality of alternative IMSIs for different networks, together with associated rules governing when the alternative IMSIs should be used. In this embodiment, the IMSI broker has access to a database store of alternative (new) IMSIs for multiple foreign networks (FNOs) and is arranged to distribute these new IMSIs as necessary to users who are subscribed to a network comprising an IMSI broker and, who are roaming across networks.

In one embodiment, each SIM has the capability of storing a plurality of IMSIs that can be used in a specific territory (country or region) to achieve the best possible calling rates. The SIM also has a set of rules to drive the selection of the best possible IMSI. Every time a user enters a different territory (mostly a new country, but it could also be a new region within a country), the IMSI Broker will issue the best possible IMSI and IMSI selection rules for that territory. The IMSI Broker will send this new IMSI to the SIM via Over The Air (OTA). This solution eliminates the need to swap out SIMs when new wholesale network deals become available. Subscribers are issued an additional IMSI when and where available.

Updates and management of the data in the SIM can be achieved over the air interface using any available OTA radio connection. Some examples, include but are not limited to, cellular signalling channels, cellular data connections, text messaging, WiFi, Bluetooth & WiMAX. A person skilled in the art will appreciate that 'OTA' shall include all possible connections to the mobile handset and any other method of transferring data to the handset device such as wired connection to a PC, Infra-Red and so on.

In one embodiment, the SIM may, at the time of manufacture, be programmed to include a plurality of IMSIs corresponding to popular destinations. In another embodiment, the SIM may be programmed with a plurality of IMSIs at registration with the network, in accordance with user selection of countries or territories to which the user expects to visit in the future. In another embodiment, the SIM may only comprise one IMSI after manufacture and registration, such that all of the new/alternative IMSIs are delivered from the IMSI Broker as and when the user visits new countries/territories.

SIMs are evolving continuously, and currently known SIMs may be capable of storing up to 256 different IMSIs in the SIM's memory. This number is likely to increase further. However, regardless of the number of IMSIs that the SIM is able to hold, other memory constraints may mean that an upper limit is placed on the number of IMSIs to be stored within the SIM. In cases where an upper limit is reached, according to one embodiment of the present invention, the SIM is able to dynamically overwrite a stored IMSI with a newly obtained IMSI. The decision as to which IMSI is overwritten can be based on a number of factors, for example, any unused IMSI may be the first to be overwritten. Likewise IMSIs that have been used the least, or which have been used less frequently may be overwritten before more popular/recently used IMSIs.

The IMSI broker maintains a database of the status of IMSIs distributed to subscribers as they roam and use different networks. In addition, the IMSI Broker is arranged to update the HLR with details of a current IMSI for each user. This is necessary in order for other parties to contact a user who is using a current IMSI which differs from their original IMSI.

It is an advantage of this embodiment of the present invention that all of the IMSIs and MSISDNs issued to subscribed users can be recorded and attributed to the user. This is advantageous for many reasons in that law enforcement agencies may be able to link call activity from users to one subscribed user account.

In addition, the facility of linking user accounts of different countries/regions to one subscribed user is helpful for "Know Your Customer" (KYC) legal requirements.

In certain countries, there are specific legal requirements relating to how users may be issued with telephone numbers and according to one embodiment of the present invention, it is possible for the user to be sent additional information (through any suitable communication channel) regarding what steps the user must complete in order to be able to complete these legal requirements.

In one embodiment, the present invention is arranged to issue a hidden telephone number (MSISDN) which is used for call routing purposes to the user. The user is never made aware of this number and so cannot issue it to other parties, or make use of it for CLI purposes.

In another embodiment, the present invention is arranged to notify the user of the issued telephone number (MSISDN) so that it can be passed to other parties for CLI purposes. As above, certain countries (for example India) may require additional steps before subscribed users in their country may be given new phone numbers. In one embodiment, the present invention notifies the user (for example, by short message service (SMS) also known as text messages) e-mail, or any other suitable communication method) what steps have to be carried out before the telephone number can be released to them.

It is to be appreciated that in some cases, the home network may have 'known' the subscribed user for a considerable time before issuing them with new IMSIs and MSISDNs in foreign countries, and as such the system of one embodiment of the present invention, may satisfy the KYC requirements for certain countries without requiring the additional legal requirements discussed above.

Figure 2:
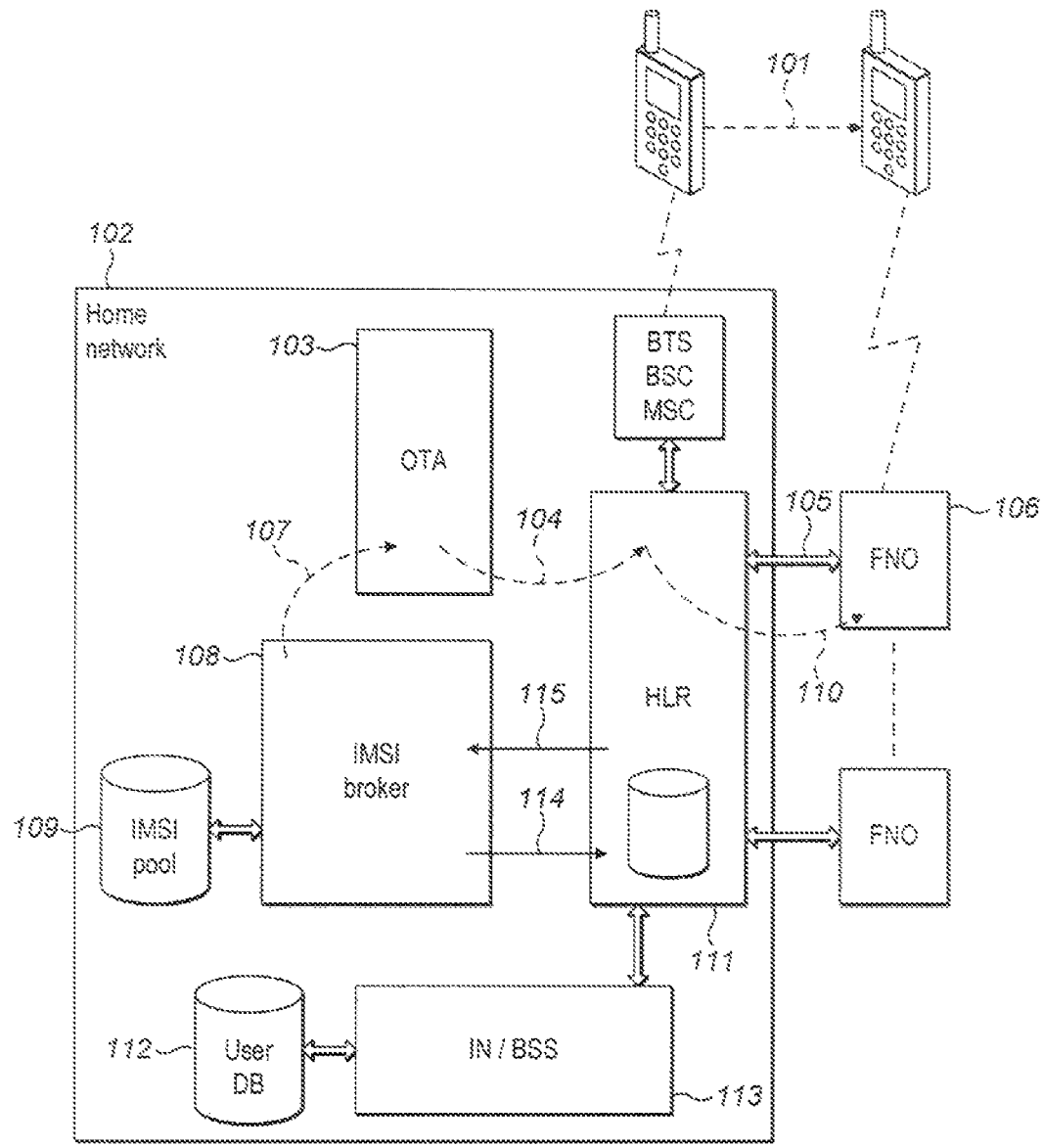
FIG. 2 is a schematic system diagram showing the overall system architecture overlaid with the path (dotted lines) of a IMSI provisioning event.

FIG. 2 shows an overview of the components within a network with an integrated IMSI Broker 108. In this sense, network need not be limited to the physical network which is operated by a single network operator. In other words, the term network may be taken to mean a collection of co-existing networks.

The network communications with the plurality of subscribed mobile phones 101 through the base station subsystem, which comprises a base transceiver station (BTS), Base station controller (BSC), and a Mobile Switching Centre (MSC).

The base station subsystem communicates with the HLR 111, which in turn communicates with the IMSI Broker 108 and an Intelligent Network (IN)/Back-office Services system (BSS) module 113. The IN/BSS module has access to a user dB 112 which comprises a record for each user subscribed to the network. The IN/BSS module 113 is responsible for monitoring the user's usage, i.e. voice calls, SMSs, data usage etc, such that a record is kept for billing purposes. In one embodiment, the IN module 113 is also responsible for ensuring that caller ID information, also known as Caller Line Identification (CLI), is stored and provided during calls while roaming, to ensure that there is transparency for the called parties.

The IMSI Broker 108 has access to an IMSI Pool 109, which is a database comprising a plurality of available IMSIs for different territories/locations. IMSIs by there nature are territory specific. They are both country specific, and may also be region specific in countries (i.e. USA, India) where there may be surcharges for regional roaming as well as international roaming. An IMSI which is registered on an HLR in one territory will be deemed to be roaming if connected to a network/HLR in a different territory. Therefore, for each territory in the IMSI Pool 109 there is a sub-pool or range of suitable IMSIs which may be used. This is described in more detail later.

The network also comprises an OTA module which is arranged to send update messages to mobile phones as necessary. See arrows 107, 104, and 110 in FIG. 2. The update messages may include alternative IMSIs and/or rule update messages. This updating mechanism is not limited to provision of alternative IMSIs or associated rules—it may also be used to provide other updates to the SIM card (such as new versions of installed software) and also for verification of settings.

The HLR is further arranged to communicate with a plurality of foreign networks (operated by foreign network operators FNOs 106). The communication channel between the HLR and foreign networks is through the SS7 network 105.

In the arrangement shown in FIG. 2, the home network is shown as including a physical networking infrastructure, including MSCs, BSCs and BTSs, adapted to provide a radio signal to a user's mobile phone. In embodiments of the invention, these elements of a physical network infrastructure need not be present. In such a case, the home network may treat every network to which the user's mobile phone is connected as an FNO. As is discussed below, this can be of assistance in allowing user preferences and behaviours to be supported without their being determined by the requirements or characteristics of a particular physical network.

Figure 3:
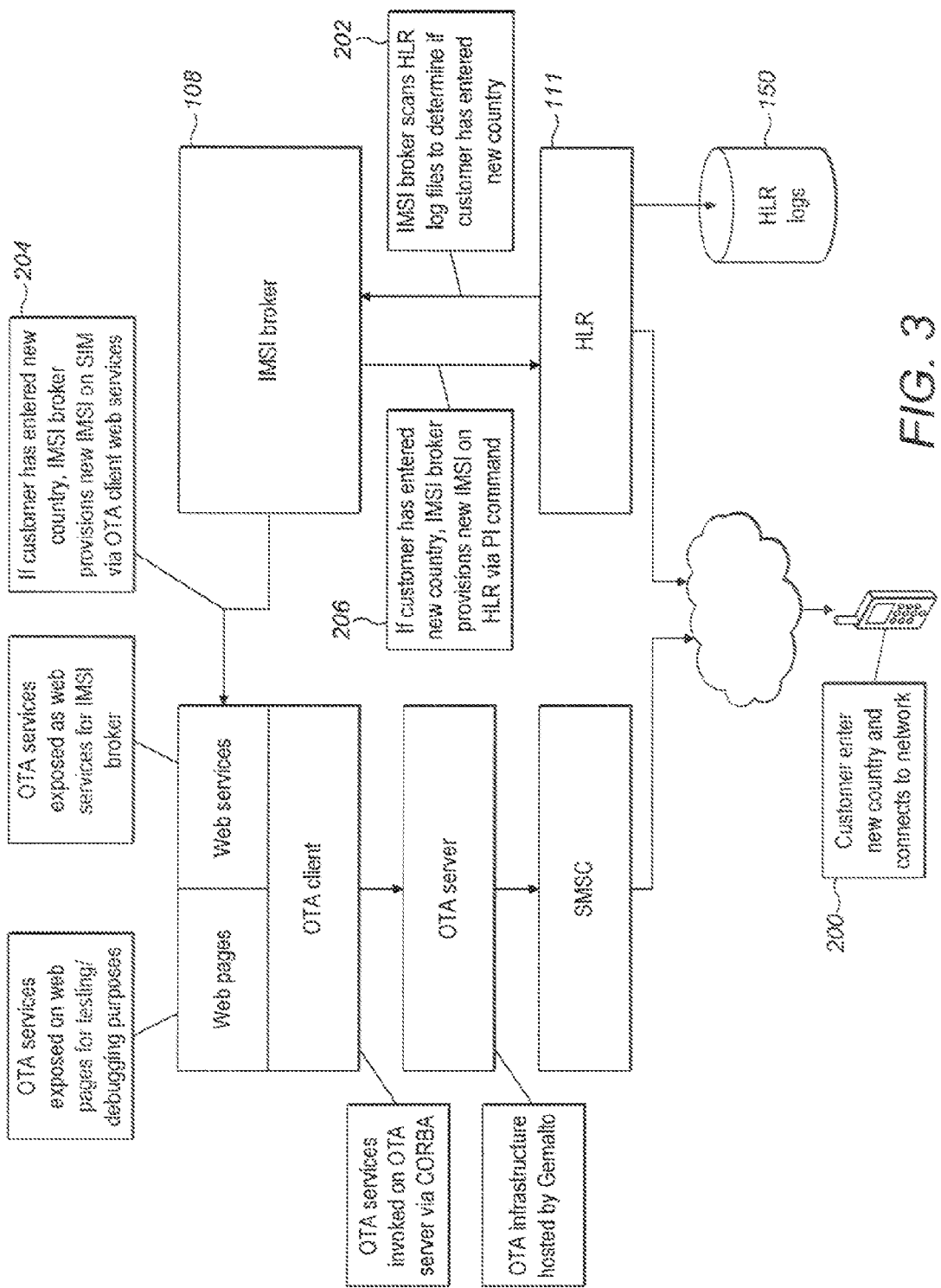
FIG. 3 is a process flow diagram showing the OTA provisioning process triggered by the IMSI broker detecting a handset has entered a new country or network.

FIG. 3 is a flow diagram showing the steps that are carried out when a mobile phone attempts to connect to a foreign network. As shown, when a mobile subscriber roams, at step 200 into an area served by another operator, messages are exchanged over the international SS7 network. The roamed-to operator obtains information from the home network's HLR and creates a temporary record for the subscriber in its VLR. The VLR then updates the HLR with location information over SS7 with a Location Update message (LU). The LU is routed to the HLR based on the global title translation of the IMSI that is contained in the Signalling Connection Control Part (SCCP) field of the LU. The HLR informs the VLR as to the status of the subscriber and whether service is to be provided in the roamed-to network.

The IMSI Broker 108 is able to monitor the HLR log files 150 to determine, at step 202, if the customer has entered a new country. If the customer has entered a new country, the IMSI Broker 108 according to one embodiment, checks the records for that subscribed user (i.e. the user records relating to that SIM) to ascertain whether there SIM already has an IMSI which is suitable for that country.

The IMSI broker 108 verifies that a subscriber to the system has the appropriate IMSI when registering on a GSM network for that particular country. If not, the IMSI Broker will update the subscriber's SIM by triggering, at step 204, the sending of OTA updates with the appropriate IMSI as well as the rules on the SIM that are used by the multi-IMSI applet on the SIM CPU to select the correct IMSI in a particular country. The IMSI Broker records that a new IMSI has been provided, and updates, at step 206, the user's records in the HLR.

Figure 4:
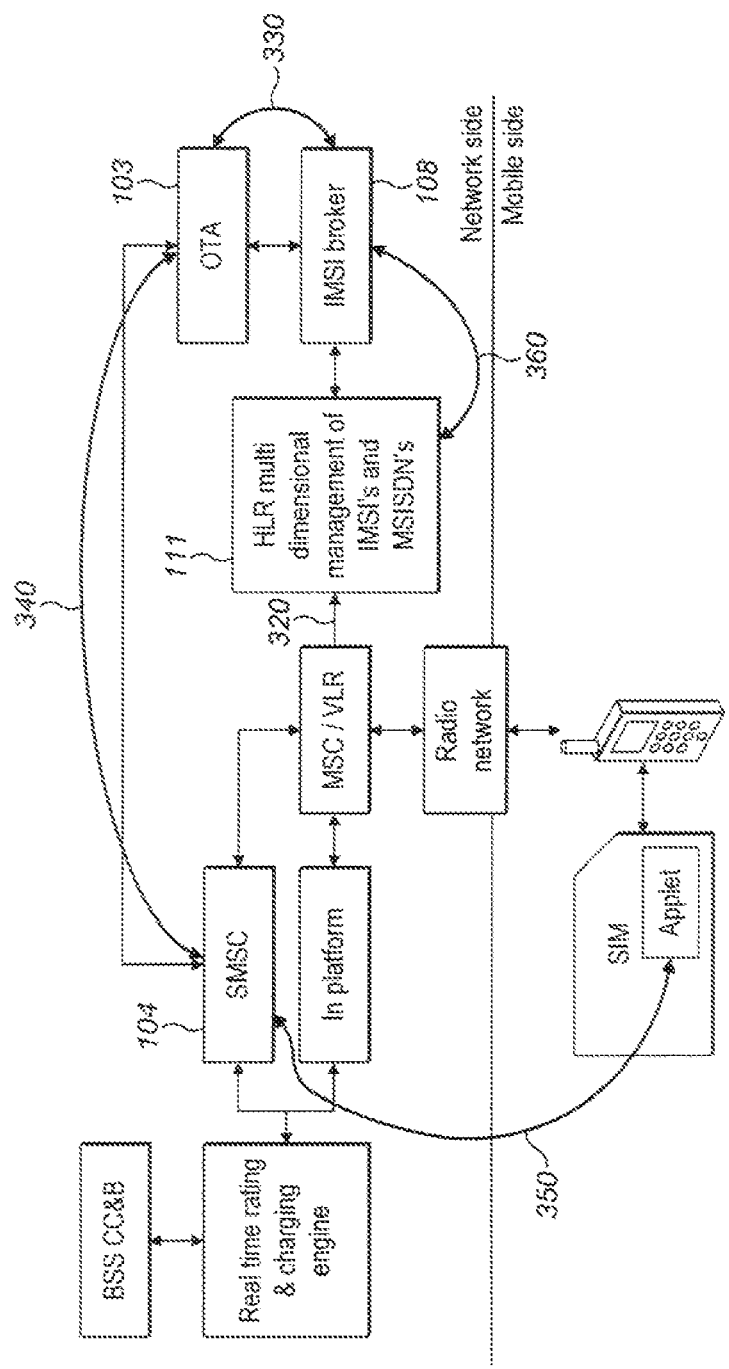
FIG. 4 is a schematic system diagram showing the signalling paths relating to a subscriber location update (LU) and provision of a local IMSI.

FIG. 4 is a functional diagram of the components within the network showing how the IMSI Broker integrates with the network. FIG. 4 shows the communication paths between the SIM of a mobile phone and the network, including an HLR, IMSI Broker, and OTA module.

The signalling paths generated for a subscriber location update (LU) are shown by the curved arrows in FIG. 4.

Figure 5:
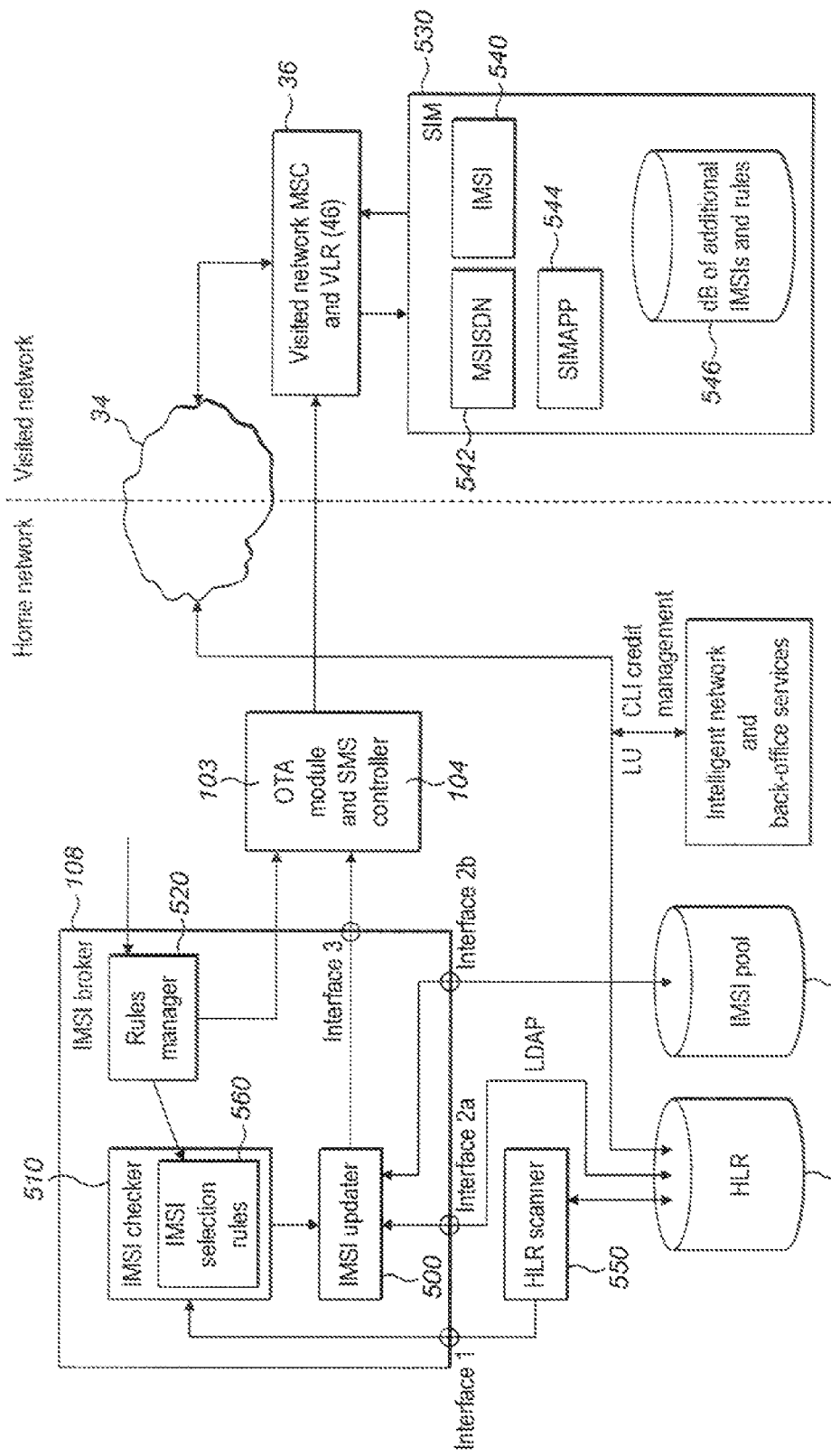
FIG. 5 is a functional block diagram of the IMSI Broker of FIG. 2 and a SIM.

A schematic block diagram of the functional components within the IMSI broker 108 is shown in FIG. 5. As shown, the IMSI Broker 108 comprises an IMSI updater 500, and IMSI checker 510, and a rules manager 520.

FIG. 5 also comprises a schematic block diagram of the functional components within the SIM 530. As shown the SIM comprises a current IMSI 540, a current MSISDN 542, a SIM application (SIMAPP) 544 for executing functional steps on the SIM, and a database 546 of available IMSIs, associated rules, and MSISDNs.

The mobile phone containing the SIM 530 communicates with the visited network over the radio network shown in FIG. 4. The visited network (MSC) determines from that communication, the current IMSI 540, which the mobile phone is using, and this points to the HLR (of home network) for the current IMSI 540. In one embodiment, the mapping and routing rules to the Global Title (GT) of the HLR are defined in every operator's IR.21. The visited network (MSC/VLR) then communicates with that HLR over SS7. This is shown by arrow 320 in FIG. 4.

As shown in FIG. 5, an HLR scanner 550 communicates with the HLR 111 and with the IMSI Broker 108. The HLR scanner 550 is arranged to scan the HLR log files 150 continuously. The IMSI broker 108 receives messages containing an Active IMSI (the current IMSI 540) and a Global Title (GTVLR) for every Location Update which is logged in the HLR. For a given subscriber, the IMSI checker 510 verifies, using a set of rules (IMSI selection rules 560), if the Active IMSI is appropriate for the target country. If not, the IMSI updater 500 retrieves an appropriate local IMSI from the IMSI pool 109, together with IMSI operational selection rules, which are executed on the SIM of the mobile phone to ensure future selection of the most appropriate IMSI. The term local in this sense means relating to or local to the user's current location, such that a mobile phone using a local IMSI will appear to the HLR of the visited network, as being a subscriber to that network, or being a subscriber to a network in the same territory. As discussed above, it is desirable to appear to be a locally subscribed device in order to avoid roaming surcharges. Local in this sense may be in relation to a particular country or region. In some countries (i.e. USA and India) users may be charged for regional roaming A person skilled in the art will appreciate that where we refer to a best IMSI for a user's current location, the best IMSI may be suitable for the country, region or network which the user is attached to. It is also possible to select the best IMSI in relation to a preferred network to which the user is instructed to attach.

In addition, roaming charges may be applied to incoming calls in certain countries/regions, and these charges can be minimised and even avoided altogether by issuing local (regional) IMSIs with national roaming privileges.

The local IMSI and the IMSI operational selection rules are passed to the OTA module 103 (arrow 330 in FIG. 4), and then on to an SMS center (SMSC) 104 (arrow 340 in FIG. 4) which is arranged to send the local IMSI and the IMSI operational selection rules to the SIM by SMS message (arrow 350 in FIG. 4). The IMSI updater 500 also records that this IMSI has been sent to that user in the HLR record for the user (arrow 360 in FIG. 4).

In one embodiment, the IMSI checker 510 is able to determine from the data record for the user, whether the SIM already contains a suitable IMSI for the target country. If the SIM already has an appropriate IMSI, then the IMSI Broker 108 will not provide a new IMSI. In one embodiment, the IMSI Broker will record that the SIM has an appropriate IMSI, and will await a further LU message when the SIM connects to the visited network using the appropriate (stored) IMSI. In one embodiment, the IMSI Broker may perform a check routine after an expired time, to check that the SIM has correctly changed over to the appropriate IMSI. The IMSI Broker may then send instruction to force the SIM to change IMSI if necessary.

The SIM 530 may select an appropriate local IMSI form the stored database of IMSIs 546, on the basis of the rules within the SIM. Alternatively, the SIM may receive a new IMSI from the IMSI Broker 108. Regardless of where the appropriate/new IMSI derives, the SIM is arranged, through an application on the SIM (SIMAPP) 544, to present the new IMSI to the phone. The phone sends the new IMSI to the visited network, so that the phone appears to be a home subscriber on the visited network.

Additionally, according to one embodiment, local Mobile Subscriber Integrated Services Digital Network Numbers (MSISDNs) are also allocated by the IMSI Broker, configured and activated so that callers can dial the user's original allocated number (i.e. the phone number of the user on their home network), even though the subscriber is now registered on a different network with a different MSISDN.

This functionality may be illustrated with the help of FIG. 1. User1 is has a mobile phone registered in the UK. User1 has an original IMSI and an original MSISDN. Without the present invention, when User1 visits Italy, he is charged roaming charges for making and receiving calls, for sending SMS messages and for using data services. With the present invention, User1 has access to a local IMSI so that when User 1 uses his mobile phone, it appears that he is a registered user in Italy, and as such does not pay roaming charges. In addition, according to one embodiment of the present invention, User1 also has access to a local MSISDN (i.e. an Italian phone number) such that when people contact User1 from within Italy, they are charged national call rates rather than international call rates. This local MSISDN may be hidden from the users' points of view, but the call routing is effected as if User1's phone number (MSISN) is a local number (local MSISDN).

In an example embodiment, the IMSI Broker typically may have the following interfaces (as shown in FIG. 5):
1. An interface to the HLR Log Scanner on which it receives IMSI and GTVLR messages for each LU of a system subscriber.
2. An interface to the system HLR commands to:
   a. Retrieve the IMSI list of a subscribed user
   b. Provision a new IMSI for a subscribed user
   These commands could be any query protocol. In one embodiment, this could be achieved using Lightweight Directory Access Protocol (LDAP).
3. An outgoing interface OF to the OTA services through which Elementary Files (EFs) on the SIM are updated with the IMSI and other relevant EF data.

Figure 6:
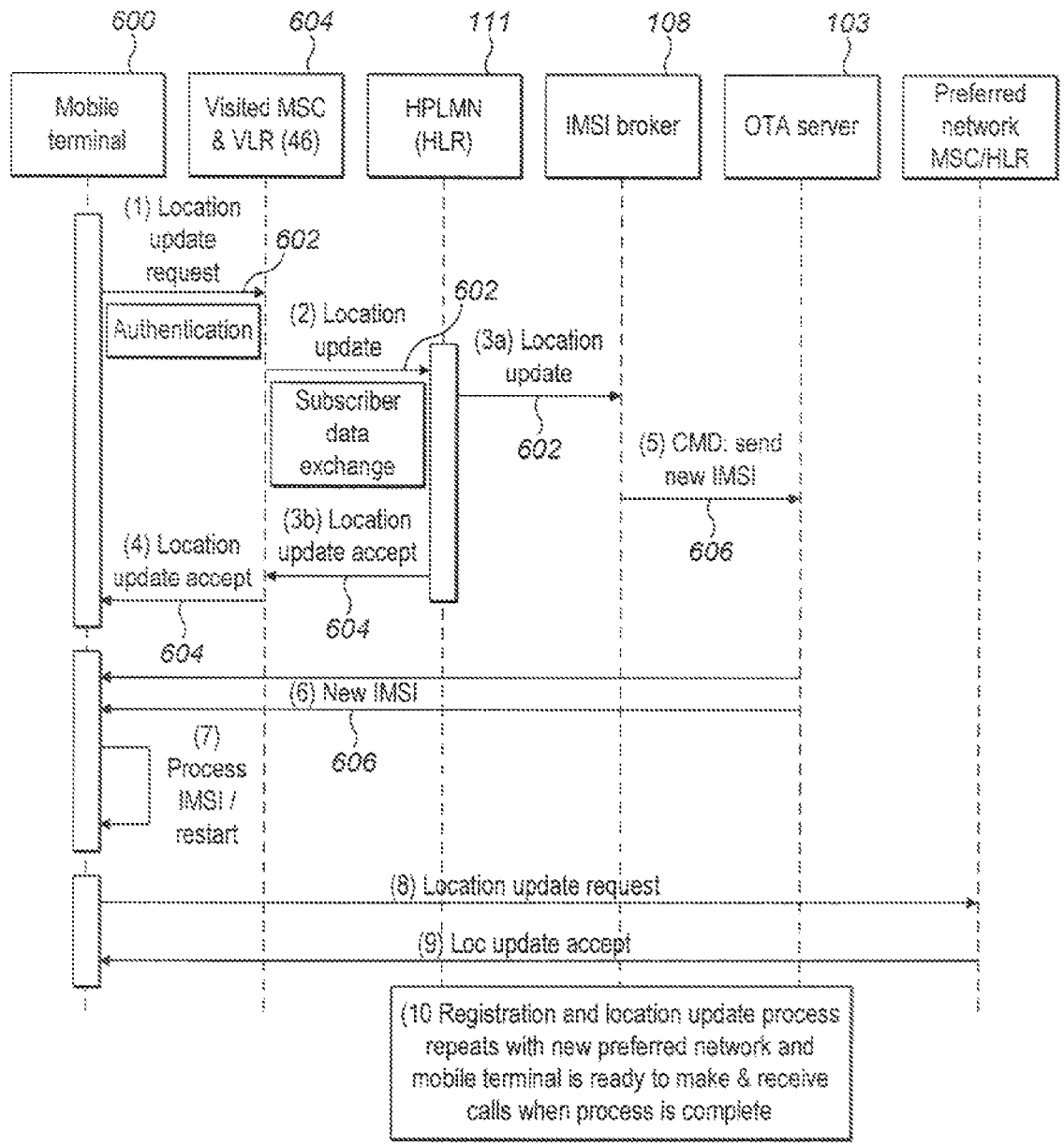
FIG. 6 is a signalling diagram showing the typical signalling generated when a subscriber enters a new coverage area for which a new IMSI it provisioned by the IMSI Broker of FIG. 5.

FIG. 6 is a signalling diagram showing the typical signalling generated when a subscriber enters a new coverage area, for which a new local IMSI is required. A description of the signals shown in FIG. 6, labelled 1 to 10, is provided below.
1. Handset (mobile terminal—MT) 600 arrives in new coverage area (i.e. when a user gets off plane in new country). A Location Update (LU) 602 request is sent from the MT 600 to the visited Mobile Station Controller (MSC) 604. The LU contains details of the MT's home network and the MSC determines that the MT is not subscribed to the network of the MSC 604. As a result, the LU request 602 is forwarded to the visited Visitor Location Register (VLR) 46. A person skilled in the art will appreciate that this is a standard network operation for a roaming handset.
2. The LU is then forwarded to the Home Public Land Mobile Network (HPLMN)/Home Location Register (HLR) 111 of the MT's home network. The HPLMN is the home network, that the user is subscribed to. The HPMLN comprises an HLR which contains the subscribed user's subscription data. The HPLMN may also contain various service nodes, such as a short message service centre (SMSC), and a service control point (SCP).
   a. This LU 602 includes an authorisation request to verify whether the user has privileges to use the foreign network. Again, this is a standard network operation for a roaming handset.
3. 
   a. The LU is identified (picked up) by the IMSI broker 108. The IMSI Broker is arranged to identify whether the MT has an appropriate IMSI(s) for a preferred visited network(s) in the new coverage area/locality.
   b. The HPLMN/HLR 111 also sends a Location Update Accept (LUA) 604 message back to visited network VLR. The LUA message contains an indication to the visited network that a roaming agreement is in place and gives authorisation for the MT to connect to the visited network and to be able to make calls and data connections, albeit at roaming rates. Again, this is a standard network operation for a roaming handset.
4. The visited network registers the MT by sending the LUA to the MT. The MT is now connected at roaming tariff rates to the visited network. This is also a standard network operation for a roaming handset.
5. The IMSI Broker 108 determines at Step 3a, that the MT does not have an appropriate IMSI(s) for a preferred visited network(s) in the new coverage area/locality, the IMSI Broker retrieves an appropriate IMSI 606 from the IMSI Pool and passes the new IMSI(s) data record(s) to the OTA module 103 to be transmitted to the MT.
6. The OTA service transmits the retrieved IMSI data record(s) to the MT via the visited network. This step uses an appropriate standard signalling method as available, such standards include but are not limited to SMS, USSD, IP.
7. 
   a. a SIM application (SIMAPP) 544 on the SIM 530 detects new IMSI data record(s), adds new IMSI(s) to SIM database.
   b. SIMAPP disconnects MT from network and causes rescan of available networks.
   c. SIMAPP detects IMSI match for preferred visited network and sets appropriate IMSI as current (which may not be the same as the original visited network)
8. MT sends LU to preferred network MSC which is identified as coming from a home IMSI. (standard network operation)
9. Preferred network registers MT with LUA
10. MT now registered as local user.

Figure 7:
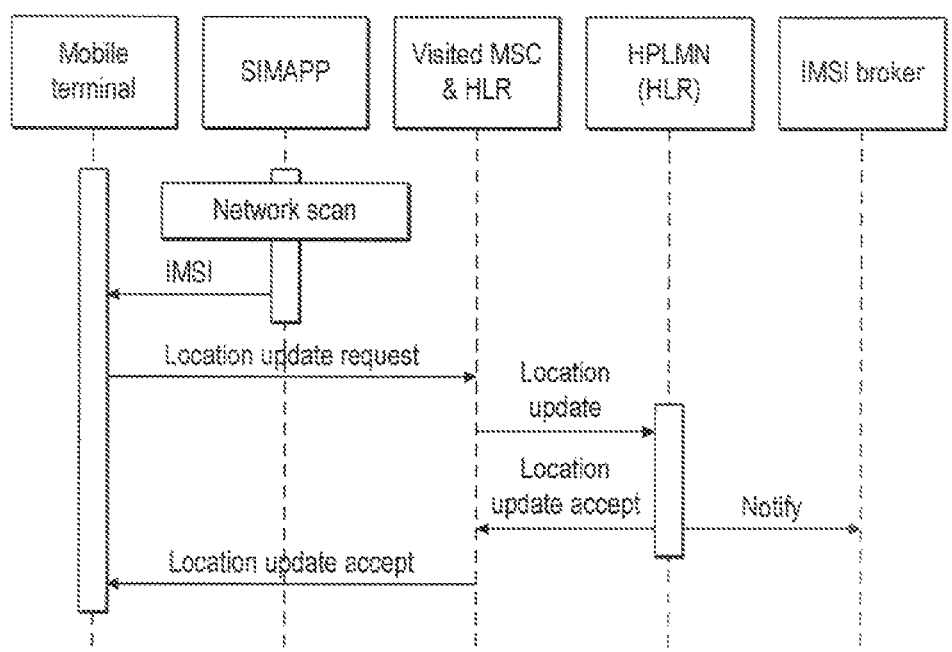
FIG. 7 is a signalling diagram showing an alternative to FIG. 6, where the SIM determines that a suitable local IMSI is already stored on the SIM.

FIG. 6 details the signalling when the IMSI Broker is to provide a new local IMSI. However, in one embodiment, as shown in FIG. 7, an applet (SIMAPP) on the SIM in the mobile device is able to check whether the SIM already has access to an IMSI which is local to the current location of the mobile phone.

The SIMAPP performs a network scan to ascertain a current location for the mobile phone. Typically, this happens at power on, i.e. after travelling and arriving at an airport in another country. But this may happen at other times, for example, when travelling across borders, a mobile phone may lose the signal of their home network, and attempt to find another network. When a new network is identified, the SIMAPP checks to see if there is a local IMSI for that territory (i.e. for network, region or country). The SIMAPP passes the identified local IMSI to the mobile phone which communicates with the visited network to perform a location update.

This location update is very similar to that described above in relation to FIG. 6. However, in this case the IMSI appears to be local to the visited network, and as such the location update is passed to the MSC & its HLR rather than as shown in FIG. 6 where it is passed to the MSC and its VLR. The local IMSI does include a pointer to the HLR of the subscribed user's home network. The home network Intelligent Network contains information about the subscribed user for CLI and billing purposes. However, in this case, the charges are not roaming charges because the IMSI is registered with the MSCs HLR and not VLR.

The IMSI Broker is notified of the location update so that the home HLR is aware that the mobile phone is using the appropriate local IMSI as expected. In one embodiment, the IMSI broker performs a check each time it receives a location update notification to ascertain whether a new local IMSI needs to be sent. And in this case, the IMSI Broker can tell that the IMSI used for the location update from the mobile phone is a local IMSI such that another IMSI need not be sent.

As in the case with FIG. 6, at the end of the signalling in FIG. 7, the mobile phone is registered as a local user with the visited network.

Figure 8:
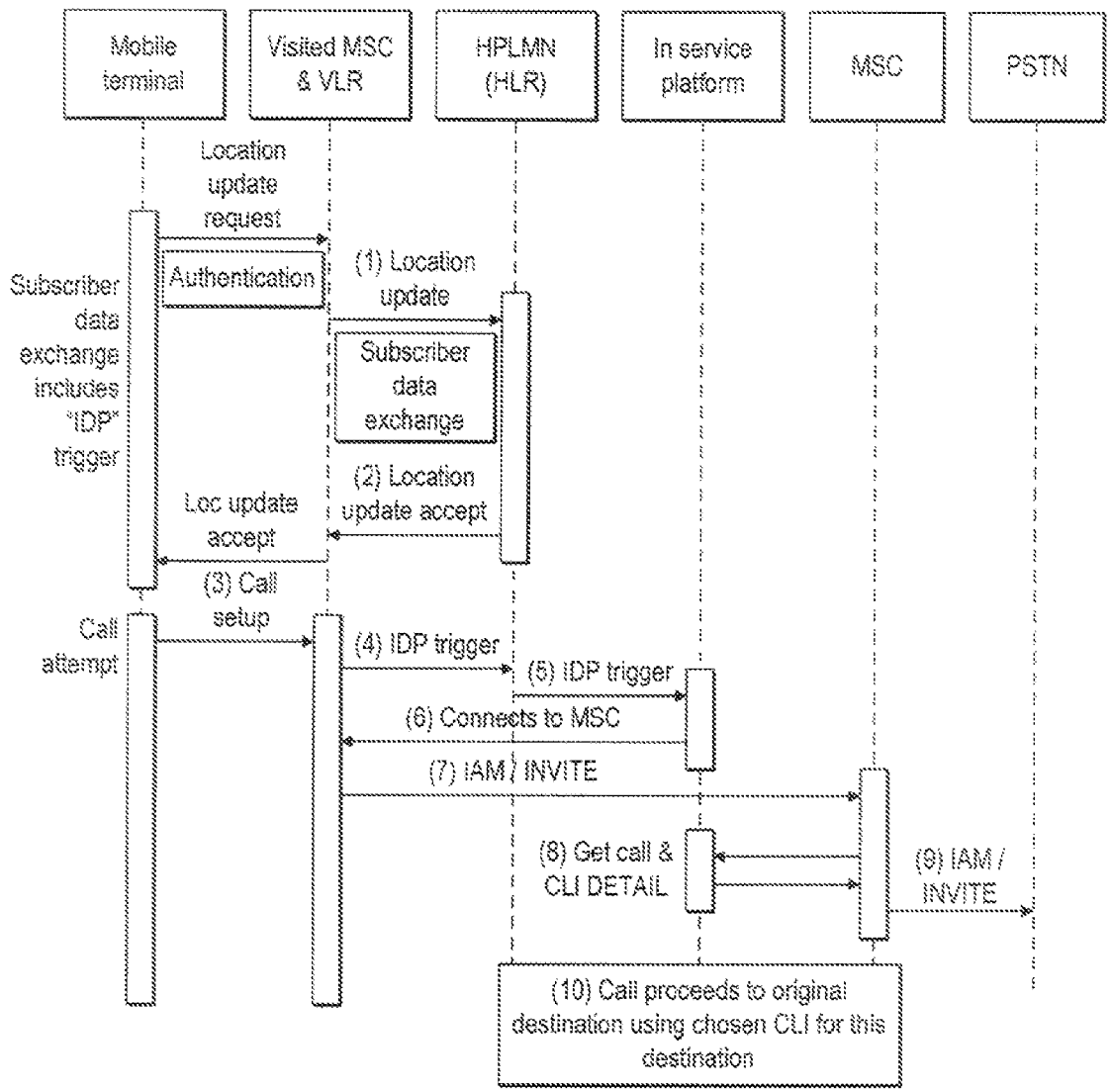
FIG. 8 is a signalling diagram showing typical signalling for CLI substitution when a subscribed user is making a call.

FIG. 8 is a signalling diagram which shows the typical signalling for CLI substitution when a subscribed user is making a call. FIG. 8 comprises Steps 1 to 10, as described below:
1. The IMSI contains authorisation pointer information such that when LU takes place on preferred visited network, the LU is forwarded to home HPLMN/HLR
2. The home HPLMN/HLR issues LUA, LUA forwarded to MT and the MT is now fully authorised.
3. The User selects number to call and initiates call on MT; call setup message sent to MSC & HLR of visited network
4. Visited network identifies IMSI as requiring Initial Detection Point (IDP) trigger to be sent to home HPLMN/HLR; the IDP trigger sent to home HLR/ (HPLMN)
5. Home HPLMN/HLR receives IDP trigger;
6. IN send message to visited HLR (VPLMN) to indicate INVITE signalling to be sent to home MSC.
7. INVITE sent to home MSC; includes destination number
8. The Home MSC retrieves call and CLI details from IN platform using rules for destination number
9. INVITE sent to destination network (here shown as PSTN but not limited to)
10. Call proceeds from MT to destination using CLI.

In one embodiment, the IN may comprise a CLI Selection Controller that overrides the CLI with one from the callee's country from the subscribed user's profile, if one exists.

In one embodiment, CLI Selection Controller is arranged to choose a CLI by:
1. Receiving a mobile originated phone call from the subscriber user;
2. Determining a set of directory numbers (DNs) available for use by that subscriber user;
3. Evaluating the cost of return call to each of the DNs in step 2;
4. Assigning the DN with the least return call cost to be the CLI for the call; and
5. Continuing the call using the assigned CLI.

In one embodiment, the CLI Selection Controller may choose a "Travel CLI" from a pool of telephone numbers which are assigned to the subscriber user for a brief period, for example 7 days.

In another embodiment, the CLI Selection Controller may choose a CLI based on a rule indicated in the callers address book for the callee, e.g., Home or Business.

A person skilled in the art will appreciate that the caller ID may comprise: numeric data; alphanumeric data. Furthermore, the caller ID may be provided as FSK data, or from an ISDN connection.

In one embodiment, a user is offered a new CLI when they enter a supported county via a text message, and this offer is made via a data or control channel.

In addition to selecting the most suitable CLI for out going calls, it is necessary to ensure the correct routing of calls to subscribed users who have a plurality of DNs (MSISDNs). This functionality is ensured as a result of how the numbers are issued. Since the numbers are issued by a particular network operator (MNO, MVNO, or MVNE), the numbers are considered as 'belonging' to those networks. In one example, calls to the numbers of subscribed users are routed to the switch of the network operator which issued the number. In another example, the calls are routed to a third party, the Intelligent Network of that third party sends a trigger to the network operator such that the network operator can make a decision regarding how the call is routed.

When the call information comes to the network operator (host), operating in accordance with one embodiment of the present invention, the Intelligent Network is able to retrieve details of the recipient, and is able to select the most suitable call route in order to complete the call.

Further details relating to incoming calls are found below in relation to FIGS. 12 to 14. However, it is to be appreciated that the above CLI logic also applies to SMS not just to calls.

According to one embodiment of the present invention, it is possible for the Intelligent Network and Back-office services system to aggregate the usage records (Customer Data Records—CDRs) for a user who is/has used a plurality of networks. This information may be presented to the user in a simple to understand single bill or statement as though the subscriber were using one network only.

This is possible because when the mobile phone is connected to the visited network using a local IMSI, the IMSI contains a pointer to the home HLR of the user, and as a result, when the user makes or receives calls in that visited network, the IN of that network is able to track the usage for billing and credit management purposes.

One embodiment of the present invention ensures dynamic allocation of calling credit across a plurality of accounts (i.e. accounts for each IMSI) with a plurality of operators such that a subscriber is only required to manage a single credit entity.

In one embodiment, the account associated with an IMSI is configured as a pre-paid account. This ensures that more complicated debit or post-pay accounts are not required.

This is an improvement over the option where a user acquires multiple SIMs and pre-loads them with credit for calling in different countries or networks, which means that the user can end up with several pre-paid telephone accounts with operators with unused credit.

In one embodiment, the Intelligent Network System ensures that sufficient credit is dynamically allocated from the user's account/pool to make a given call. In addition, the Intelligent Network System can ensure that any unused credit is recovered for allocation to the next active account.

A person skilled in the art will appreciate that the allocation of credit to accounts and the subsequent recover of unused funds is possible centrally through the Intelligent Network System. The only requirement in relation to the present invention is that credit is applied to IMSI accounts for users who have available credit in their account. In some cases, this credit may be pre-paid credit, while in other cases the user may be billed subsequently for services used. In both cases the user must have available credit in order for the call to be made.

Figure 9:
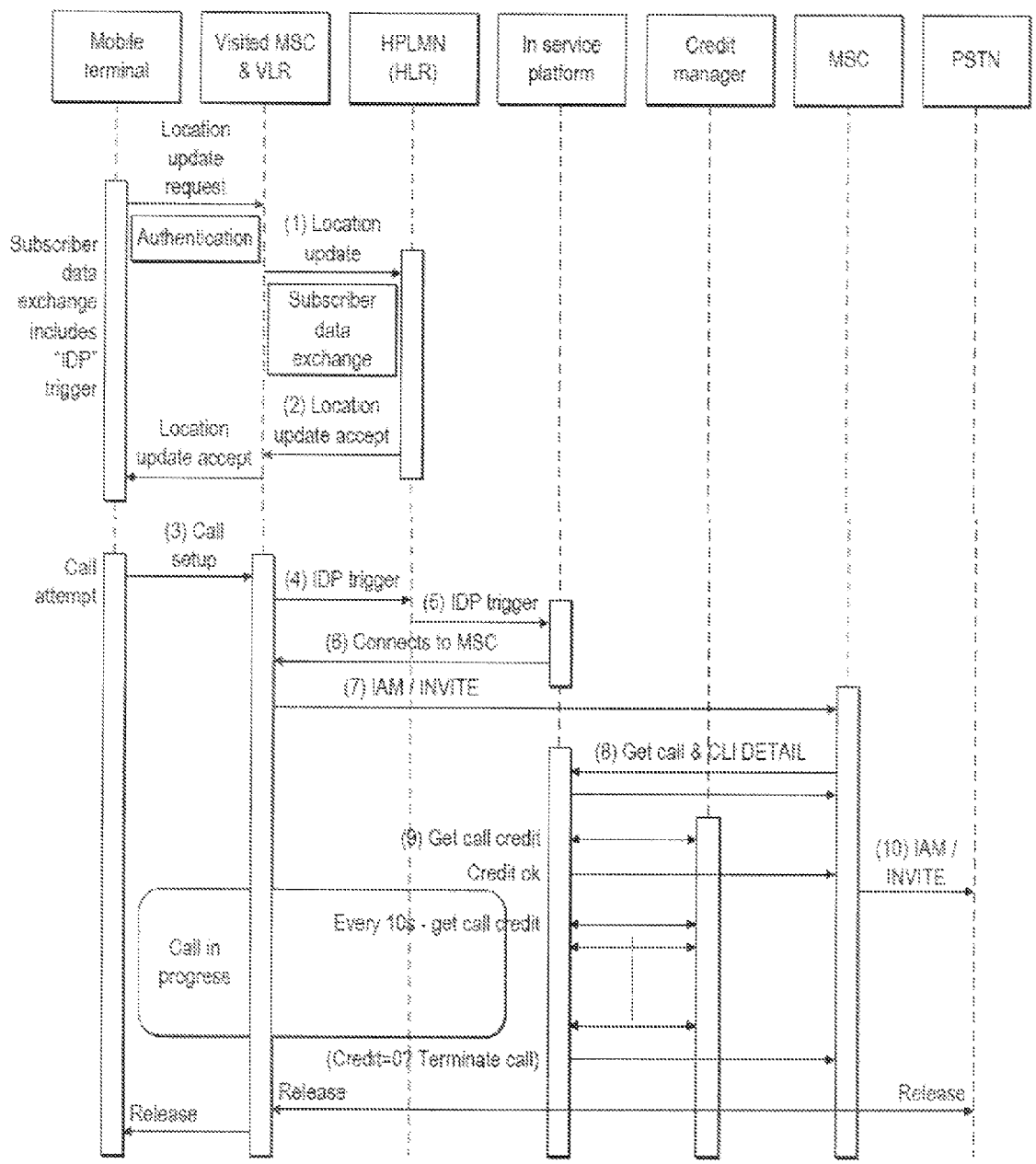
FIG. 9 is a signalling diagram similar to FIG. 8 showing a credit manager and including signalling relating to billing and credit management functions.

The above functionality is highlighted in FIG. 9, which is very similar to FIG. 8, but which now includes the signalling between the home network MSC, the Intelligent Network, and a credit manager. As before, the home network MSC retrieves call and CLI details from IN platform using rules for destination number. Now at step 9 in FIG. 9, the IN platform requests a credit check for the user to the credit manager. The user passes the credit check, and a CREDIT OK signal is passed to the MSC so that the call may be connected. As the call continues, the IN platform requests top-up credit for the IMSI account so that the credit (assuming the user has available credit) does not expire while the call is pending. As shown in FIG. 9 the get call credit transactions may occur every 10 seconds are so. In this way, the call is routed using a local IMSI to get favourable rates, but the IN of the home network can continue to add small amounts of credit to the account associated with the local IMSI. By adding small amounts of credit as necessary, it is possible to avoid having unnecessary credit in an IMSI account which may be wasted or used infrequently. As described above, it is also possible for the credit manager to remove unused credit from an IMSI account if necessary, at the end of a call.

The ability to reconcile customer information relating to billing to all the separate IMSIs that are used by a particular user is important not only for user convenience (one bill from one provider, who has been responsible for all IMSI provisioning), but also for Know Your Customer legal requirements. The ability to reconcile these separate identities at a single home network with extended knowledge of the user may make it easier to satisfy Know Your Customer requirements (and, for example, to allow proof that these requirements are satisfied in one country to contribute towards acceptance of the customer in another). There are some situations in which the presence of multiple available IMSIs may cause complexity—one is in contactless payment (using local communication technologies such as RFID to trigger payments—use cases are discussed in ETSI TS 102 412), where the payment will need to be tied to a clearly identified customer. In such a case, it may be desirable to identify the mobile phone by the ICCID uniquely associated with the physical SIM.

In a detailed example embodiment, the IMSI broker data store may be configured as follows:
1. DS_GT_IMSI_Mapping. DS_IMSI_Pool.
2. DS_EF_IMSI_Rules. This DS stores the exact image of the entire content of the EF file to be downloaded to the SIM via OTA.
3. DS_IMSI_Broker_Event_Log. This DS logs all events from the IMSI Broker. The log contains for every entry at least the following information:
   a. Date/Time
   b. ResultCode
   c. $GT_{VLR}$
   d. Original IMSI
   e. New IMSI DS_GT_IMSI_Mapping
This DS stores the IMSI Range to be used for a particular GT Prefix. This DS has a record structure.

| GT_Prefix | IMSI_Range |
|---|---|
| The first n significant digits of the GT to identify the country/network of a VLR. 1 to 6 digits | The IMSI Range to be used for this GT_Prefix 5 to 6 digits |
| EXAMPLE DATA | |
| In NL (31) use 20407 (Teleena) IMSI Range. | |
| In PT (351) use 23450 (Jersey) IMSI Range. | |
| 31 | 20407 |
| 351 | 23450 |
| 34 | 20404 |
| 1681 | 318095 |
| 1 | 23450 |
| 2 | 23450 |
| 3 | 23450 |

DS_GT_IMSI_Pool
This DS stores the Last_Issued_IMSI of a trusted location-based application(s)TLA IMSI Range. This DS has a record structure.

| IMSI_Range | IMSI_Last_Issued |
|---|---|
| The IMSI Range to be used. 5 to 6 digits | The last IMSI in this range issued to a TLA sub. New IMSI are assigned by simply incrementing this value however in the future an IMSI database could be used that allows for the recycling of numbers. 15 digits |
| EXAMPLE DATA | |
| 23450 | 234507891234567 |
| 20407 | 204078800000111 |
| 20404 | 204047891212123 |
| 318095 | 318095440000001 |

In a typical embodiment, The IMSI Broker may perform the following process steps when a new LU message is received from the HLR Log Scanner.

```
ON new LU message containing IMSI and GT_VLR received from HLR
Log Scanner
BEGIN
    LOOKUP GT_Prefix in DS_GT_IMSI_Mapping, using GT_VLR,
returning IMSI_Range.
    IF first 5 or 6 digits of the IMSI do not match IMSI_Range
    BEGIN
        GET new IMSI (IMSI_New) from DS_IMSI_Pool matching
        IMSI_Range
        (incrementing Last_Used_IMSI)
        Retrieve IMSI_List from HLR (using LDAP)
        Provision IMSI_New on HLR using LDAP)
        Send OTA to add IMSI_New to SIM in EF_IMSI_List
        Send OTA to replace EF_IMSI_Rules with
        DS_EF_IMSI_Rules
    END
END
```

In a typical implementation, the IMSI broker will be able to perform many parallel requests and should be preferably capable of processing hundreds of requests per second.

If there are situations where the range of IMSIs for a given operator are limited, the IMSI broker may preferably be able to return inactive IMSIs back to the pool for re-issue to another subscriber at a later time. This could be achieved by additional OTA messaging to deactivate and/or delete an EF record on a target and/or by indicating that a given IMSI previously issued to a subscriber and the system HLR is now inactive or deleted from the HLR.

Call Routing

Optimised call routings connections can be made via any available routes as necessary and appropriate for cost saving and service availability. Calls may be routed through any combination of the following communication networks: Cellular, Landline (PSTN), WiFi, and IP.

For example a 'Standard' Low cost call from UK mobile to USA Mobile may be routed as follows:

Conventional cellular connection>UK NO>UK service gateway>IP>USA service gateway>USA NO>Conventional cellular connection.

This uses IP for the long haul from UK to USA so that the total call cost is 2 local connections.

In another example a 'Near Free' call from UK to Australia with both handsets capable of VoIP over WiFi (VoWiFi) may be routed as follows:

VoWiFi>UK ISP>IP Routing service>IP>Australian ISP>VoWiFi

In yet another example, a low cost call from Indian mobile to UK landline may be routed as follows:

Indian Cellular>Indian NO>Indianservice gateway>IP>Uk service gateway>UK landline.

A person skilled in the art will appreciate that there are many more combinations are possible. For example FIGS. 10 and 11 include details of signalling for optimised call routing using CAMEL and USSD call back techniques. A person skilled in the art will appreciate that from the various techniques for optimised call routing which are known, the present invention is able to operate using these optimum call routing options in addition to providing suitable IMSIs and selecting preferred networks as discussed below.

Figure 10:
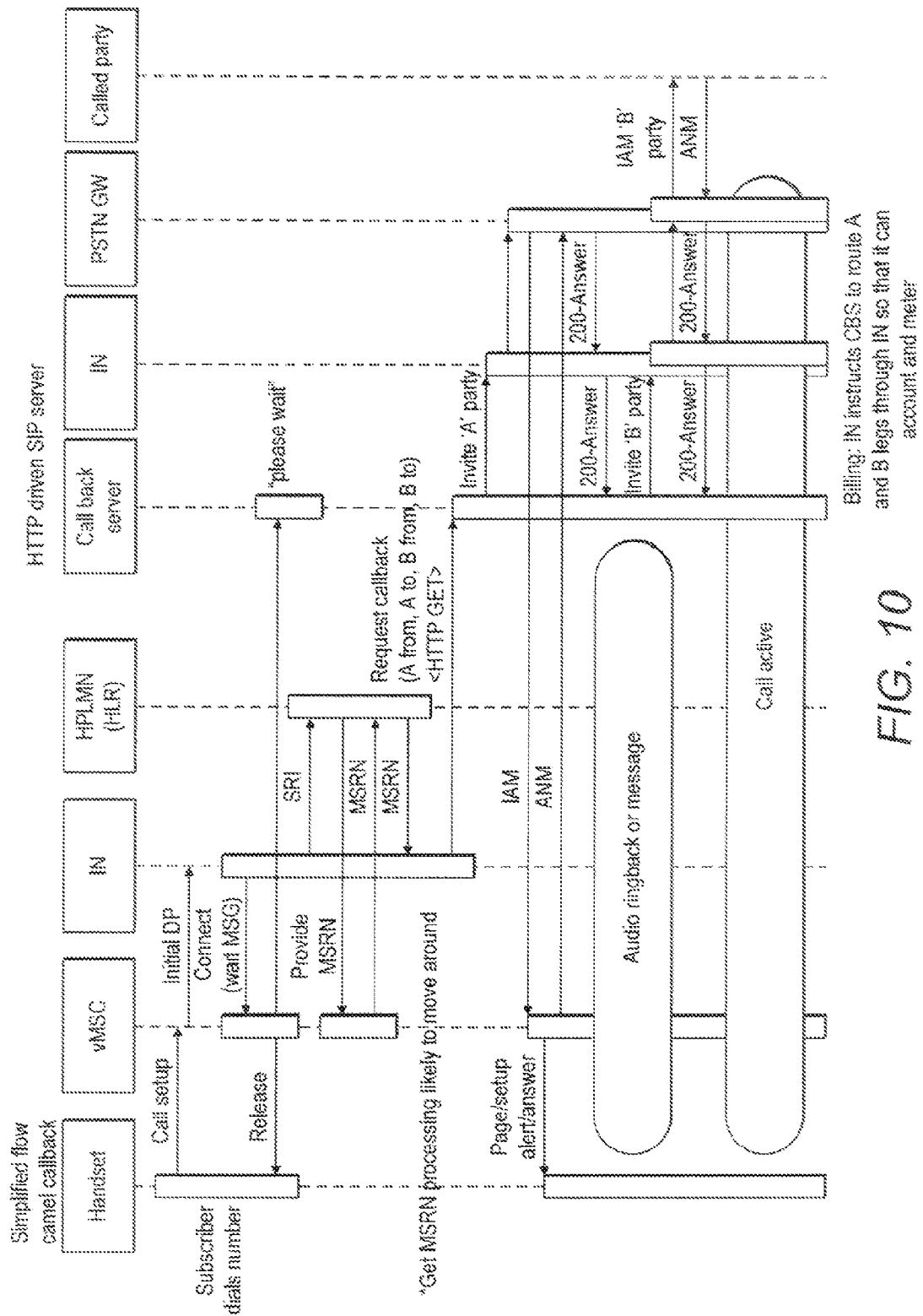
FIG. 10 is a simplified flow diagram for a CAMEL callback call set up arrangement.
Figure 11:
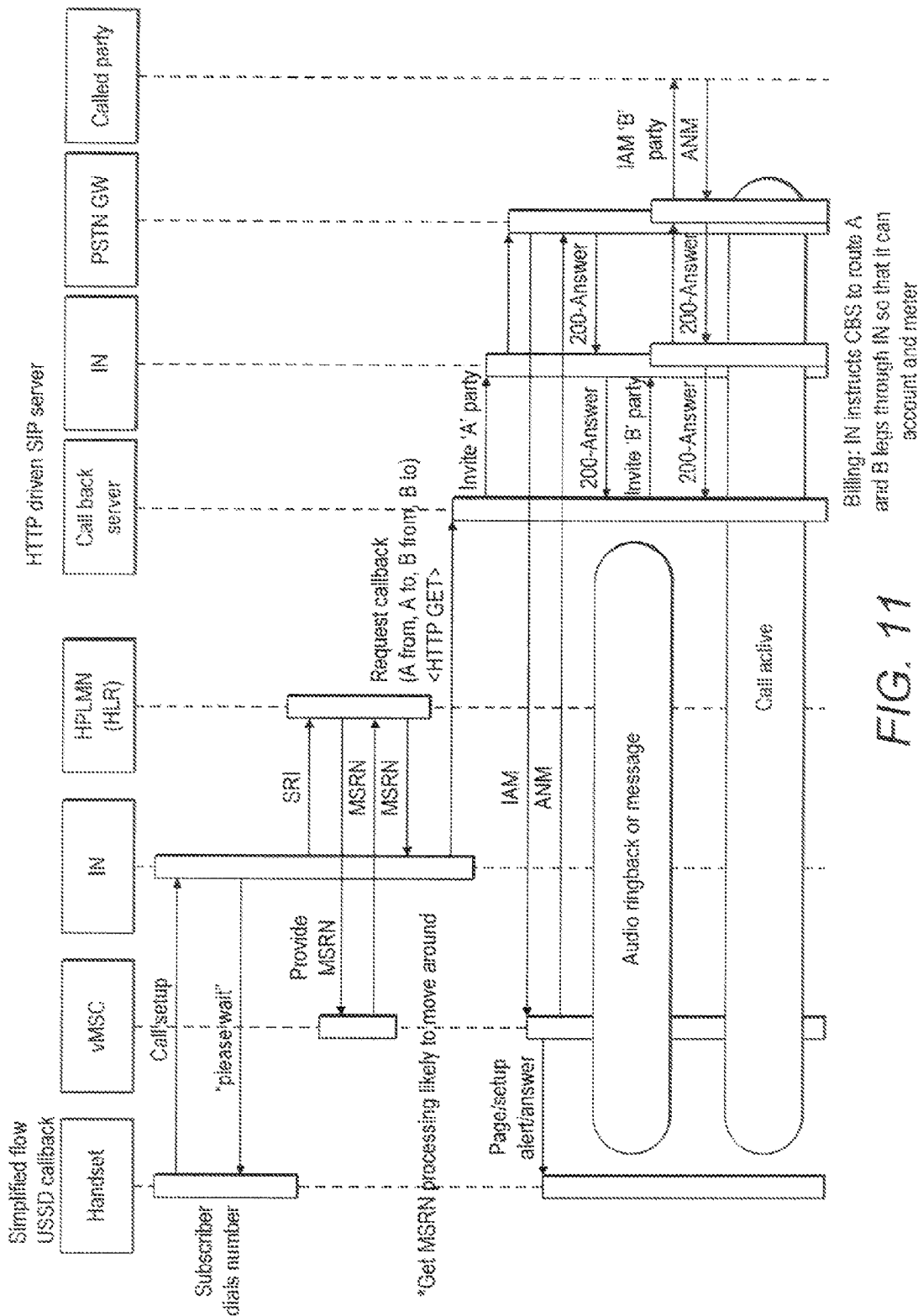
FIG. 11 is a simplified flow diagram for a USSD callback call set up arrangement.

A person skilled in the art will appreciate that the method shown in FIG. 10 is an improvement over the system described in WOLFMAN (EP1850625).

Use of this architecture can allow for user preferences to be realised more effectively, by allowing the IN of the home network to be used to provide user preferences and to interpret information from the user. For example, the user may not need to customise his or her mobile phone contacts directory to be internationally independent (by including number in a format such as +14025551212). The IN will have access to the user's information, and will typically be aware that the user's home location will be (say) the UK, and thus that numbers should be interpreted as being UK numbers with the UK prefix to be added on dialling of these numbers from outside the UK. When using, for example, a CAMEL callback mechanism as shown in FIG. 10, the dialling of a number by the user without a country prefix may be interpreted by the home network IN as a call to a UK number and the prefix provided accordingly. This could of course apply to any home network location, and not specifically to the UK.

Preferred Network Management

Networks and handsets work together to ensure continuity of connection to a network service. However, this may not be the most favourable strategy for this system and for the user. As described above, a user's mobile phone when travelling near country or region borders, may inadvertently attach to a foreign network, even though the phone may be physically located in a home territory. This switch in network may occur if the user's home network's strength falls, meaning that the mobile phone will attempt to connect to another stronger network. In addition, at power-up, mobile phones perform a scan of available networks, and depending on a set of rules governing network selection, the mobile phone may select the strongest available network, which may not be the most favourable network in terms of call charges.

Figure 12:
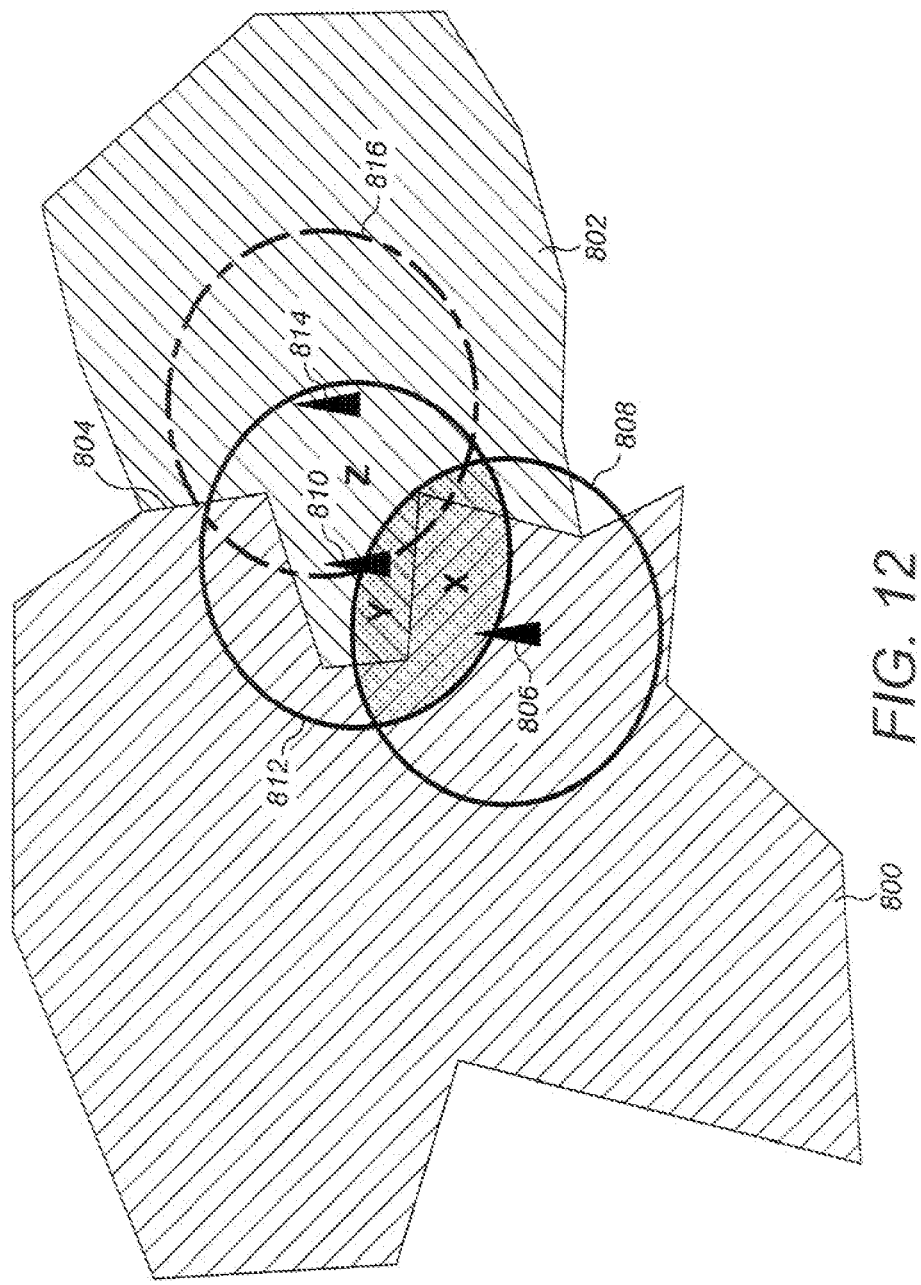
FIG. 12 is a schematic illustration of two neighbouring countries and cell coverage across the borders of the two countries.

This problem is illustrated in FIG. 12, which shows two countries 800, 802 (although this could be two regions within a country) sharing a border 804. A first cell tower 806 (base station) provides coverage approximated by a first circle area 808 for a home network, and a second sell tower 810 provides coverage approximated by a second circle area 812 for a first foreign network. A user subscribed to the home network at location X, may inadvertently be connected to the foreign network, even though the user has not left their home territory.

Under normal operation, once a mobile phone is attached to a network, it remains attached to it until signal is lost or if the subscriber manually disconnects. As a result, the user may charged high roaming charges for an extended period even if though they were physically in their home territory.

According to one aspect of the invention, the mobile phone is able to determine from the current location a preferred network rather than maintaining a 'status quo' connection or simply connecting to the network with the strongest signal power. The mobile phone may determine the preferred network by receiving an OTA message from the user's home network. Alternatively, the mobile phone or SIM within the mobile phone may be programmed to select a preferred network from the available networks on the basis of network selection rules within the mobile phone/SIM.

This aspect of the invention may be coupled with the IMSI Broker system such that the mobile phone may be arranged to attach, using an appropriate IMSI, to the most favourable network a given area.

In one embodiment, the system (i.e. the user's home network or mobile phone/SIM) is arranged to recognize when a user is in a location where a more favourable connection is available. This is achieved through monitoring of network registrations and location updates. The system is capable of signalling over the air from the host to the mobile phone that it should detach from the current connection and perform a search for a more favourable network.

Location Management and Usage

As described above, the system is configured to be able to identify the current location of the subscriber handset. This current location may be used to perform status updates, SIM data updates and other system functions to optimise the connection and routing of calls. In one embodiment this is performed by the host system in response to the current location information arriving from the mobile phone. In another embodiment, the mobile phone may itself determine from location information stored within the mobile phone/SIM a preferred network, on the basis of network selection rules stored within the mobile phone/SIM.

Location information can be derived from a plurality of sources. Some examples are Network Country/Operator ID, GSM (Cellular) Cell ID, WiFi access point ID, other fixed radio network location identifiers (CDMA, EVDO, WiMAX for example), GPS and equivalents. The current location may be cross-checked with database tables containing network coverage for various locations. In one embodiment, the location information may be related to key landmarks, for example airports. In another embodiment, the location information is solely dependent on physical location/map knowledge. This is because network preferences may be determined on theoretical preferences, known to the host, even when a subscribed user is currently not picking up a network.

The table of network preferences may be stored on the mobile phone/SIMs and can be modified by the host network as required using the OTA service.

The ability to determine network preference on the basis of location can be particularly useful in situations where a user has entered a new potential service coverage area, but say only WiFi is currently available. In this case, it would be possible to deploy a new IMSI ready for use, even before network coverage has been reached.

Forced Reconnection/Rescanning

As described above, the system is capable of instructing the handset using OTA signalling under host system control to disconnect from its current connection to a network and to rescan for an optimal connection.

This functionality, is further illustrated in FIG. 12. A user in their home country, at location X, should attach to the home network. When the user travels to location Y, they are still within the coverage area for the home network, and so should remain attached to the home network. However, when the user travels to location Z, they are outside the coverage area for the home network, and would initially appear to be roaming in a foreign network. In addition to the IMSI Broker providing a local IMSI for the new country, the home network is able to determine from the current location of the mobile phone which of the available networks is the most preferred network. In FIG. 12, a network coverage area for a second foreign network 814 is shown by the dashed circle 816. Location Z falls within the coverage areas 812, 816 for both the first and second foreign networks, and so on the basis of a network preference list the home network where the user is registered is able to determine which network the user should attach to. If necessary, the mobile phone will be instructed to detach from a less preferable network before attaching to the preferred network. In addition, the IMSI Broker may be arranged to obtain a local IMSI for the preferred network, as opposed to an IMSI that is local to the new territory.

This IMSI Broker server instruction to change IMSIs is referred to as a 'kick'. The benefit of using server initiated IMSI switching is that much more information is known to the server about the current state of networks, costs and the location of the user, than is known to the software running in the SIM. The ability to switch IMSIs under software control should be done in conjunction with the understanding that the SIM needs to be able to re-contact the HLR through execution of an emergency reconnect process—such a process will also be needed if contact is lost with a network being treated as "home" if there is no physical network associated with the HLR and the different IMSIs are peers. To be specific, if a SIM is instructed by the network—kicked—onto a different IMSI and after a period of time (about 5 minutes) is unable to connect it must rescan all its IMSIs in order to reconnect with the HLR.

When the IMSI has been chosen and has connected to the HLR and the HLR confirms that this is a reliable link either through an active acknowledgement or simply no objection being raised after a period of time then the SIM should signal to the device and other applications running on the SIM that there has been an a change and other applications should behave appropriately. For example upon SIM swap and a period of stability of 3 minutes the SIM could signal to all companion applications on the SIM that the IMSI is now stable and other applications could report information or log into system.

Applications (software) in the SIM and in the device may need to be aware of the IMSI swap process to operate correctly. The SIM shall keep track of the IMSI swap process and shall be able to inform applications on the SIM and the handset of the current status and when a change of that status occurs. The SIM may also be inform the user. Applications on the SIM or device may also be able to query the SIM to find out the status of the IMSI selection. A variety of mechanisms may be used for this status indication, including a specific SIM interface message, a specific SIM based webservice, a specific use of a SIM toolkit message or proprietary SIM file. The SIM may decide that the IMSI swap is stable based on time, a number of specific SIM messages since the last authentication following the IMSI change or on a specific message from the HLR or network.

Figure 17:
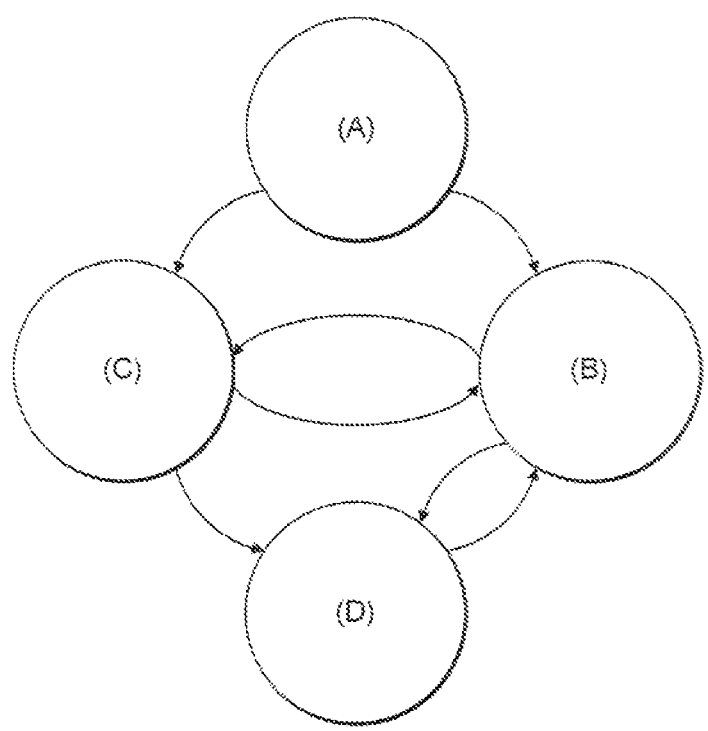
FIG. 17 is a schematic illustration of the state diagram for a SIM card in embodiments of the invention.

A minimum of 4 states shall be held by the SIM; (A) Initialised—this state is means that the SIM has not yet determined which network it should be on. It is typically the state that the SIM is in after power on or a restart. (B) IMSI Changing—this state means that the SIM has determined that it needs to use a different IMSI and that the IMSI change process has not yet completed. (C) IMSI Stable—this state means that the SIM has determined that it is on the correct IMSI and that the IMSI selection has stabilised. (D) No available service—this state means that the SIM has exhausted its rules and has not been able to use an IMSI that will deliver service. As detailed above, the SIM shall repeatedly attempt to select an IMSI that is valid so it can leave this state. The SIM state diagram illustrated in FIG. 17 shows the SIM initially being in Initialised state (A). If it determines it is on the correct IMSI it changes state to IMSI stable (C). If it determines that a SIM swap is required it changes state to IMSI changing (B). From IMSI changing state (B), once the SIM determines that the device has successfully registered on the correct IMSI and is stable, the SIM changes to the IMSI stable state (C). If the SIM exhausts all of the IMSIs it can use and cannot register on any of them it changes state to No Available Service (D) and shall attempt to restart in A after a predetermined time. If the SIM is in state IMSI stable (C) and an event happens that requires a change of IMSI (for example changing country) then it shall change state to IMSI changing (B).

In one embodiment, the Intelligent Network comprises a Network Location Manager which monitors network registrations and location updates and causes handsets to reregister with a more favourable network.

In one embodiment, the mobile phone communicates logistics including a set of available network operators to the IMSI broker to influence the IMSI selection rules. The IMSI broker comprises a rules manager which is arranged to add IMSIs and/or mobile network operators to the available pool to provide additional choices. In addition, the rules may be updated in dependence on changes to reciprocal agreements between networks.

In one embodiment, a new IMSI is dynamically assigned to a currently attached handset causing is to register with a newly assigned network.

In one embodiment, the network selection and IMSI provisioning may be based on theoretical network preferences for a given location, without relying on the networks which appear to be available to the mobile phone.

When basing network selection decisions on theoretical network preferences, the host may be able to determine that for a given location X, that networks A, B, and C, are theoretically available. The host may know that network C is the preferred network for low cost call routing. However, the mobile phone may only be able to detect/pick-up Networks A and B. In one embodiment, the host may send an instruction for the mobile phone to detach from the current network (could be A or B) and re-scan (at full power) for available networks in an attempt to ensure that the mobile phone may attach to the preferred network. In this sense, the host is also arranged to ensure that the mobile phone has or is provisioned with an appropriate IMSI for that network, in that location.

In addition, when IMSIs/networks are removed from the IMSI pool/list of preferred networks, all currently assigned IMSIs (for those deleted networks) are invalidated and all SIMs currently registered with those IMSIs are caused to reregister with a valid network.

Incoming Call Signalling

Figure 13:
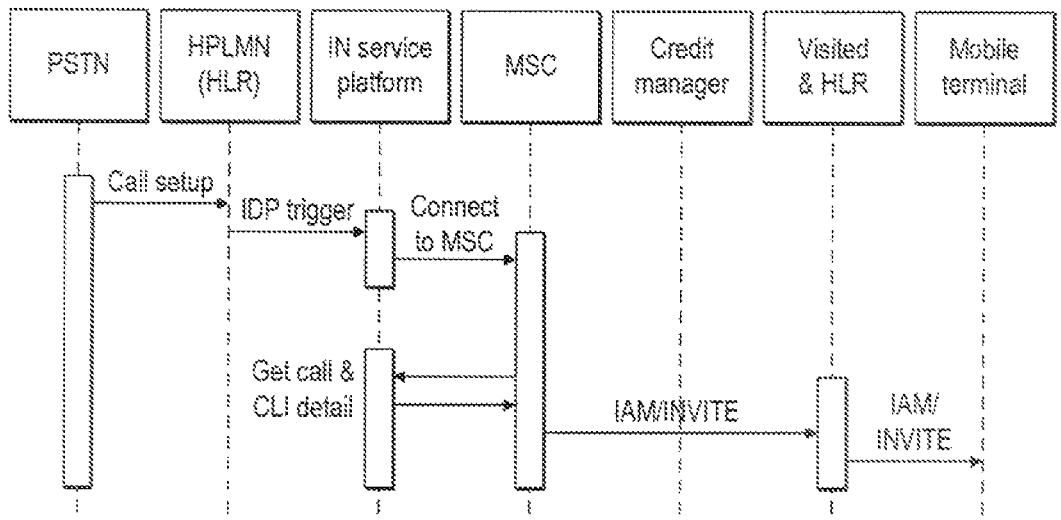
FIG. 13 and FIG. 14 are signalling diagrams relating to the signalling of an incoming call.
Figure 14:
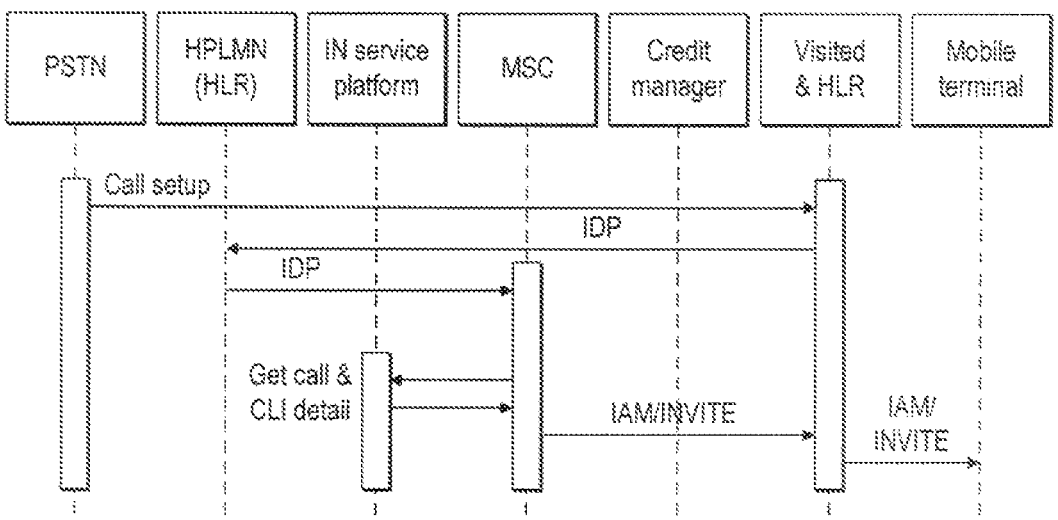

Referring to FIGS. 13 and 14, an incoming call from non-subscriber (PSTN shown) is either routed directly to the system HPLMN/HLR or via visited HLR to home HLR. This ensures that the system always has optimal control of call routing, CLI presentation and call costs. Depending on the arrangement with visited network, the incoming call may be initially routed direct to the system HPLMN/HLR or to the visited network. If the latter, then either the signalling is redirected to the system HLR or the visited HLR looks up the data from the system HLR to determine call routing and presentation.

Incoming Call Routing

Incoming calls to a subscribed user are preferably made by calling a local number that the user is known by in the caller's territory; alternatively it is possible for the subscriber to be called by calling any one of the subscribers number from anywhere—although the caller may not get the best rates in this case.

Figure 15:
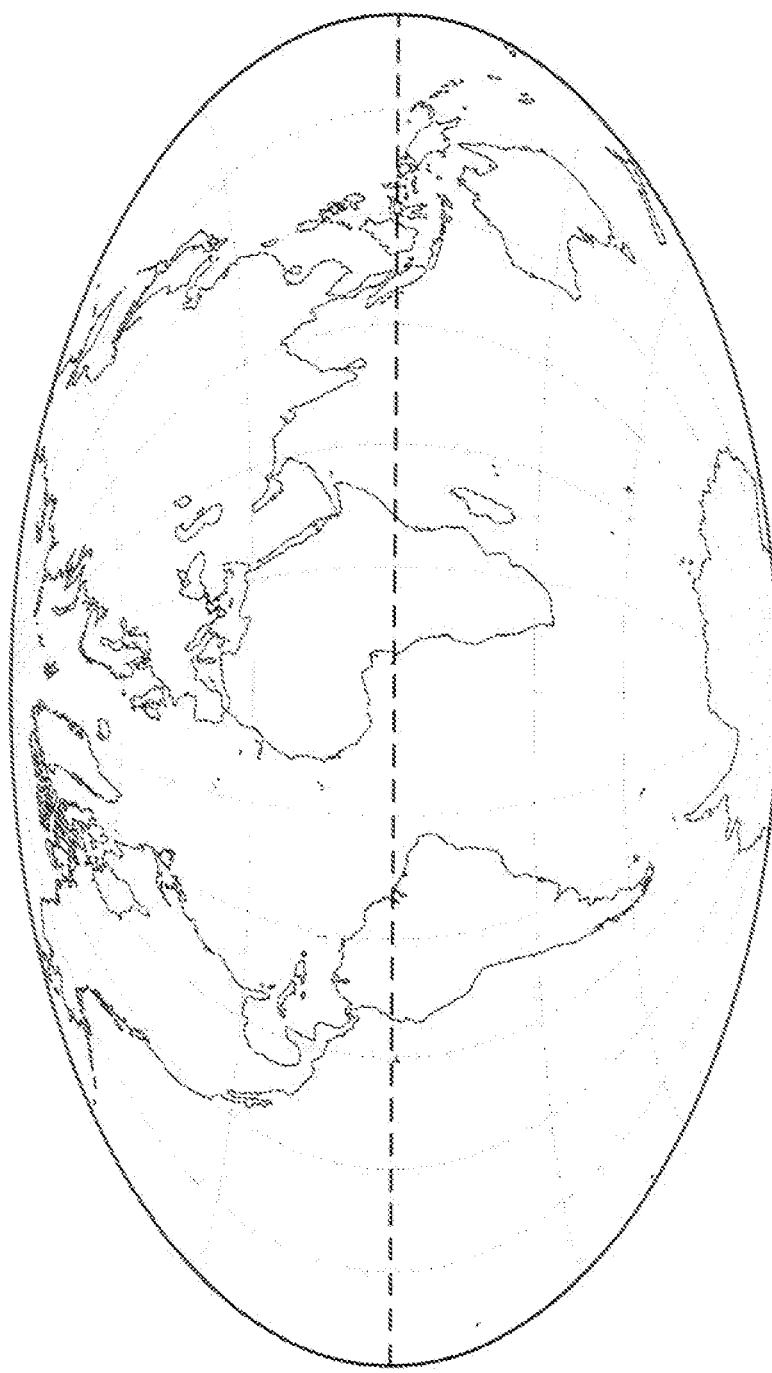
FIG. 15 is a map of the world illustrating a method of setting up user preference rules for incoming call routing on the basis of location, current time, and time-zone.
Figure 16A:
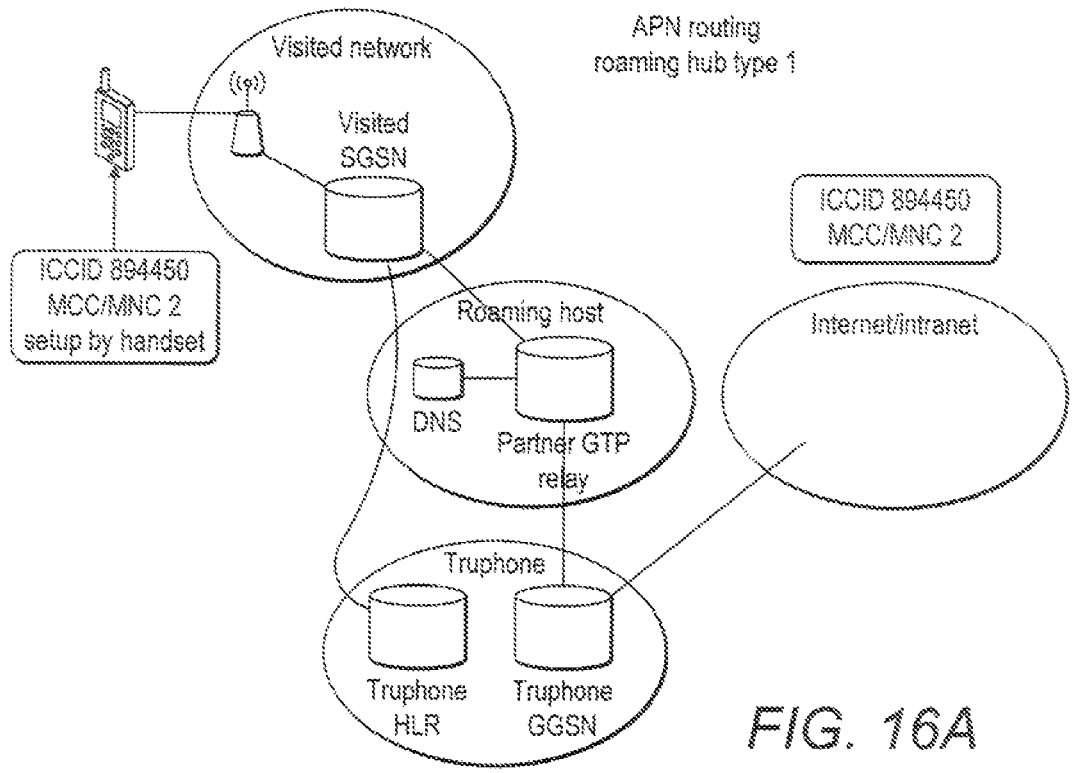
FIGS. 16A-E illustrates architectures which enable a handset to use a common set of APNs in embodiments of the invention.
Figure 16B:
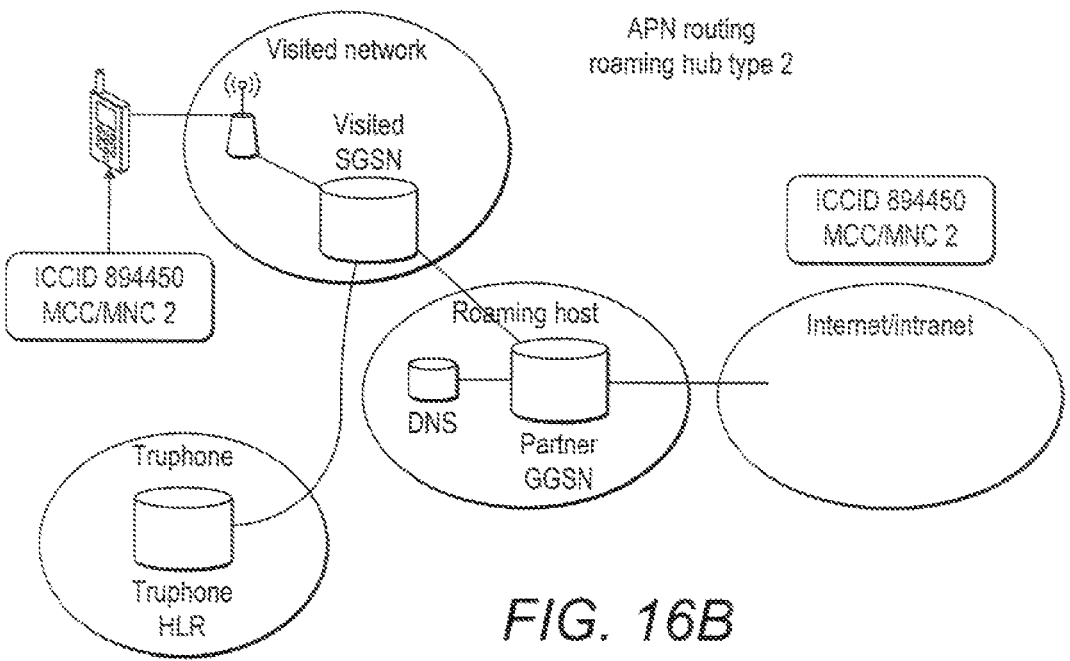
Figure 16C:
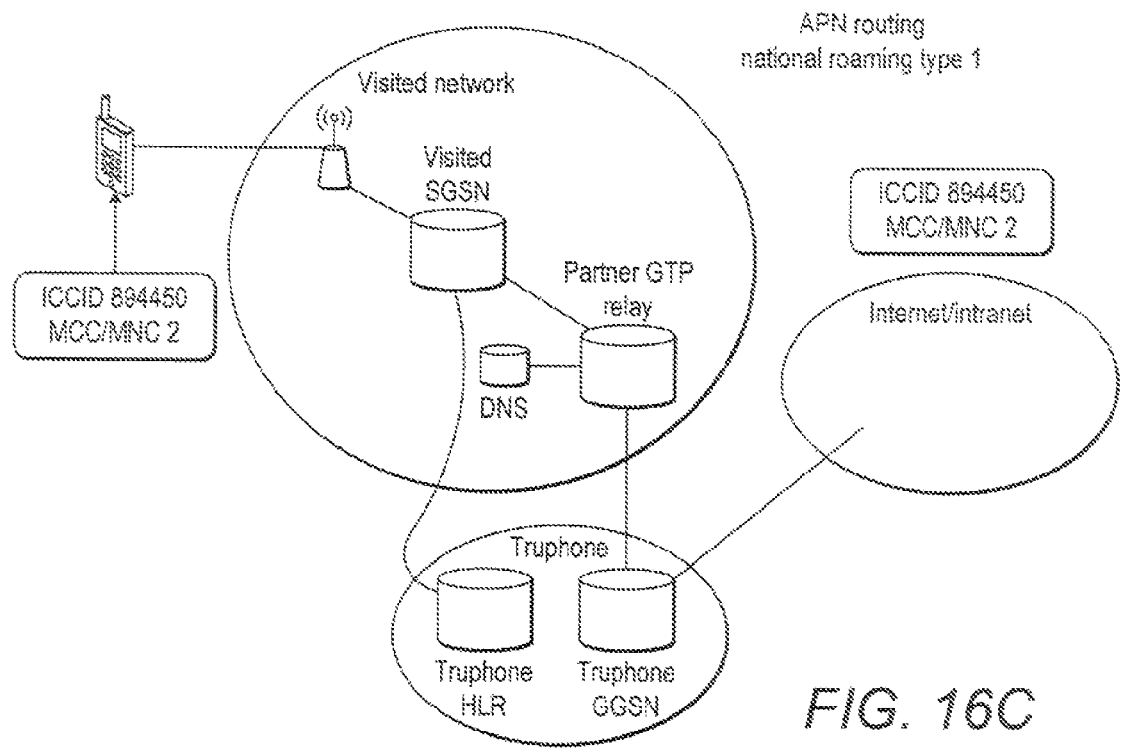
Figure 16D:
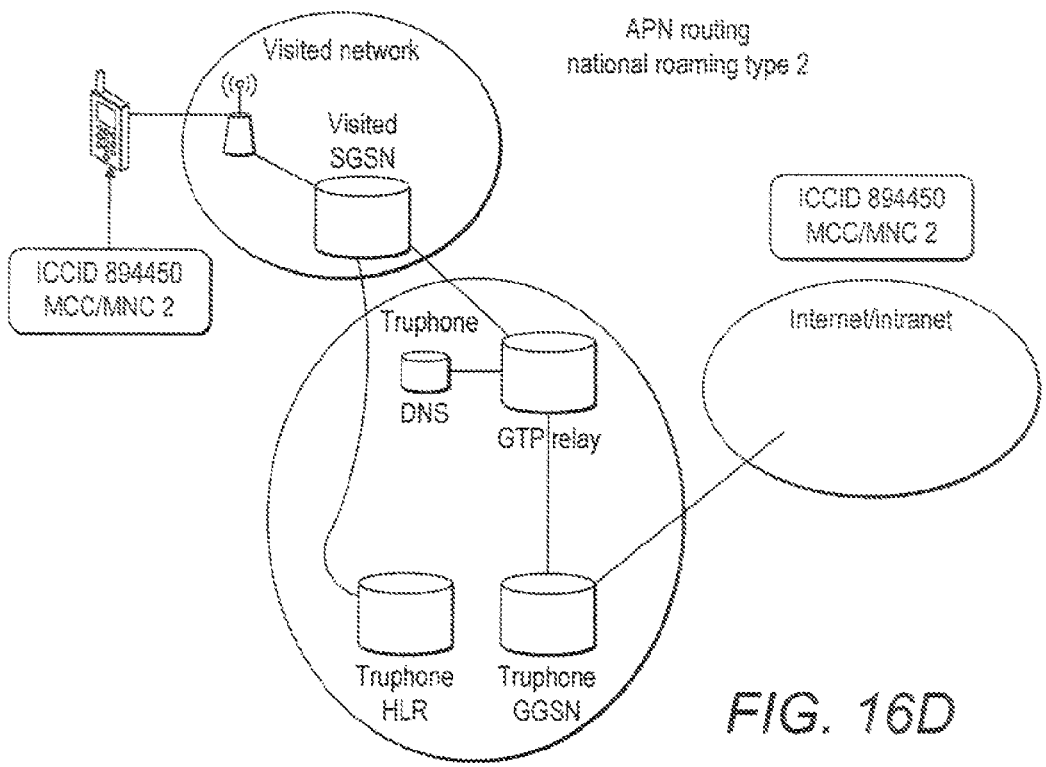
Figure 16E:
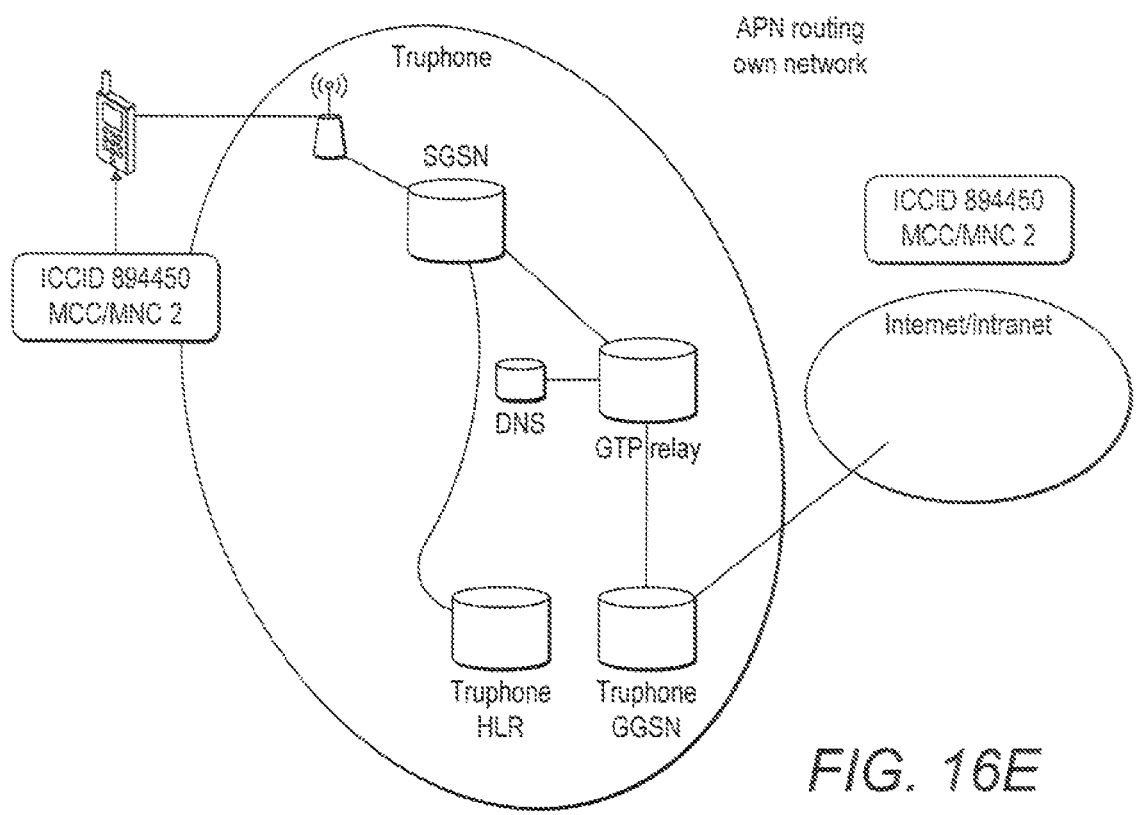

Additionally, the subscriber may set up additional routing rules—for example, time based and location-modified time based rules so that the caller may be optimally routed to the subscriber's phone, his voicemail or another colleague in his office. Where the voicemail is one which is unified across all or some of the user's IMSIs or MSISDNs, it may be desirable to identify positively with the voicemail which of the user's numbers was the one actually called. Another use of this rules processor could be for when the caller may not be aware of the time zone of the subscriber, so the time based rules can optionally play a message informing them of this and whether to continue with a call. FIG. 15 is a map of the world illustrating a method of setting up user preference rules for incoming call routing on the basis of location, current time, and time-zone. This refers to: (a) local numbers being used to call the subscriber from different parts of the world as well as (b) time (zone and time of day) rules.

Outbound calls have a different set of rules: when a subscriber calls one of his contacts, the CLI presentation is such that the contact will preferably see the subscriber's number not only as one that the contact will recognise but also as a low-cost number to call back.

In summary, because all call or call signalling is controlled through the system HLR/IN, rules controlling call routing and CLI presentation may be applied to all incoming and outgoing calls so that the system can be optimised for the best user experience. This approach also allows the user to determine that different MSISDNs can be treated differently, or be associated with different service provision. In a conventional arrangement, supplementary services are enabled or disabled by SIM card, independently of MSISDN or any other factor. Such supplementary services may relate to caller line identification (such as CLIP for presentation of caller line identification and CLIR for restriction of it) but also may include services such as call forwarding. For example, a user may have two MSISDNs: +14025551212 and +447408800000. The user may specify that call forwarding and CLIR will be provided for the US number, but not for the UK number. This can be implemented with the mediation of the home network IN, which is able to implement actions which will be mediated through the home network or will be able to arrange for appropriate provisioning of the mobile phone logic where implementation at the mobile phone is required.

Machine to Machine Communication

An increasingly important area for mobile communication is in machine to machine communication in which a communication channel is opened between machines without initiation or direct participation of a person. Use cases include security systems, asset tracking, automated payment mechanisms, and remote sensing, monitoring and metering (3GPP TS 22.868 and ETSI TS 102 412 describe a series of use cases for such technology). As many of these use cases require frequent communication (if typically with low overall data transmission volumes), it is very desirable to be able to manage these effectively. The IMSI broker approach described here is particularly suitable for such use cases. Further practical issues associated with effective machine to machine communication are discussed in 3GPP TS 33.812, which would be considered by the skilled person in implementing a specific machine to machine solution.

A person skilled in the art, will appreciate that roaming applies to GSM networks but also to CDMA, as well as other cellular communication networks. CDMA systems generally do not have a separate SIM module but rather contain all the authentication information within the device. A person skilled in the art will appreciate that this invention may be applied to CDMA systems using the same essential principles but storing multiple credentials within the device memory.

The examples used for the above illustrations primarily relate to mobile phone roaming. However, a person skilled in the art will appreciate that the techniques described herein may be suitable for communications routed through any combination of channels including cellular, WiFi, VoIP, and landline. For example, in some situations (where it is not possible to provide an IMSI from an FNO which is fully satisfactory for intended purposes, for example), the IMSI Broker may provision an IMSI which will allow access to an bearer using SIP so that calls may be made over networks using internet protocol. In addition, the example illustrations herein centre on voice calls. However, the same techniques apply when users are using their communication devices to access additional communication services including connection to voicemail, and connection to other networks such as Skype and MSN. Similarly, these techniques may also be used for data services and text messaging.

Increasingly, users browse the World Wide Web or obtain resources from the public internet from their mobile phone. Use of the IMSI broker and home network IN allow for the user's internet experience to be determined by user preferences, rather than by the user's network connection status. Typically, web page preferences (for example) will be localized to a user's network connection (for example, if a user is connected to a UK network operator, Google will localize to google.co.uk) because the local GPRS network will connect to the public internet through a GGSN (Gateway GPRS Support Node) associated with that GPRS network (and consequently with its geographical location). Use of the home network IN allows for routing of the connection so as to provide appropriate localization for the user, and hence correct preferences.

In order to provide consistency and continuity of service to the user, it may be desirable for the user to use a consistent APN, or set of APNs, when accessing data services. To do this, it is necessary to make these APNs available whatever IMSI the user is currently using. This could be done by making the home set of APNs available to each such IMSI, or by providing a DNS proxy to a home DNS server and ensuring that the HLR grants permission to use the relevant APN or APN set generally for that user. A user may thus use many IMSIs while still being connected to one or more home APNs for service provision.

In embodiments in which there is no physical network associated with the home network, then all physical networks have an equal priority. This may have practical advantages—for example, it is then not necessary for the SIM to return to a home network IMSI for any service. Where such a home IMSI exists, it would be normal to return to this IMSI between outbound calls, which would require a rescan and thus a time when the subscriber would be unavailable. Where all IMSIs have equal validity, then any can be used for appropriate identification, password provision etc. for any visited networks. Service selection decisions may be made to best suit the user—selection may be on the basis of the presented IMSI, but need not be if another choice would be advantageous.

A person skilled in the art will appreciate that in an alternative embodiment, the mobile phone may be arranged to request a local IMSI after determination that a suitable IMSI is not stored within the SIM. The request may be made to the IMSI Broker using OTA services. In this embodiment, the IMSI Broker would not need to receive notifications from the HLR scanner regarding location updates, rather the IMSI broker would simple carry out the steps of obtaining and sending a local IMSI when requests are received from mobile devices.

In one embodiment, when a user roams to a new country and is given an IMSI for that country, the user may be offered the choice to add this new country to a roaming profile (stored in the user database, which is pointed to from the HLR), so that they may benefit from lower calling and receiving rates. However, the decision regarding the issuance of IMSIs may be performed independently of any user interaction such that the system can ensure lower connection rates for all call routing.

As stated above, one aspect of the present invention keeps track of the subscribers network identifiers and can switch between practical identifiers without loosing track of the primary customer identity. The primary customer identity is usually a unique human being (but can be a machine or sometimes a company entity such as a department). The identifiers are commonly the customers IMSI (International Mobile Subscriber Identity) that resides on a SIM (Subscriber Identity Module) or their telephone number MSISDN (Mobile Subscriber In Number) or other important identities such as MAC address, IP address, email address and IMEI number (Mobile Equipment Identifier). In addition, references to identity authentication may include a username and password details instead of an IMSI.

As is indicated above, IMSIs and MSISDNs may be swapped when roaming to obtain advantageous pricing. It should be appreciated that other factors may be used to determine the most appropriate choice of IMSI. There may be alternative IMSIs of similar cost which differ in the services that they provide or support. Another factor, such as consistency of user experience, may be more important to a user than price. The following is a list of factors which may be used as well as, or instead of, call cost when determining which of a set of suitable IMSIs or MSISDNs should be selected in a given situation:
  Handset capability (a handset may be more compatible with one network than another, or be more effective at particular band frequencies)
  Subscription service level (a data only tariff may have a different selection process from a voice and data tariff)
  Network reliability
  Possibility of load sharing on connecting links
  Reported Quality of Service (may vary with time of day, for example)
  (for MSISDNs) To present a consistent identity to a handset, network or contactless application.

A person skilled in the art will appreciate that IMSIs may be preloaded onto SIMS in many different ways. For example, travel itineraries may be used to preload IMSIs in the handset for the anticipated visited areas. This may be done predictively (for example, if a UK-based user is detected in Singapore—a travel hub for much of Asia—the user may be provisioned not only with an IMSI for Singapore but with an entire Asian IMSI set). In addition, an on-line travel company data feed may be used to optimize IMSI assignment. Also, a user's travel history may be used to preload new IMSIs into a mobile device. In one embodiment, IMSIs may be assigned dynamically to a mobile phone if the subscribed user visited a region more than a predefined number (say 3) of times in the prior year. These approaches may be used to provide the user with a consistent user experience in almost every geographical location.

As the IMSI Broker dynamically assigns IMSIs, for a given IMSI for a given subscriber, additional information is stored as to whether the IMSI is 'in use', 'user active' 'system active', or 'inactive'. The IMSI Broker is able to track the provisioning of IMSIs, re-using IMSIs as necessary.

In order to provide consistency and continuity of service to the user, it may be desirable for the user to use a consistent APN, or set of APNs, when accessing data services. To do this, it is necessary to make these APNs available whatever IMSI the user is currently using. This could be done by making the home set of APNs available to each such IMSI, or by providing a DNS proxy to a home DNS server and ensuring that the HLR grants permission to use the relevant APN or APN set generally for that user. A user may thus use many IMSIs while still being connected to one or more home APNs for service provision.

Five common architectures that allow the handset to use the same APNs are described here and illustrated in FIG. 16:
  1) APN Routing—Roaming hub type 1.
  In this architecture the handset (A) with a SIM or USIM (B) communicates via a visited 3GPP network (C) to the visited SGSN (D). The visited SGSN (D) then communicates with the multi IMSI aware HLR (F) in the home network environment (G) to determine whether the APN is allowed and where to route the data for this APN. In this case the data is routed to a GTP relay (H) in a roaming hub (I). The roaming hub GTP relay (H) uses a DNS server (J) to determine where to route the data onwards. This is typically to a GGSN (K) in the home environment (G). The GGSN (K) then routes the data to the destination internet/intranet environment (L).
  2) APN Routing—Roaming hub type 2.
  In this architecture the handset (A) with a SIM or USIM (B) communicates via a visited 3GPP network (C) to the visited SGSN (D). The visited SGSN (D) then communicates with the multi IMSI aware HLR (F) in the home network environment (G) to determine whether the APN is allowed and where to route the data for this APN. In this case the data is routed to a GGSN (M) in a roaming hub (I). The roaming hub GGSN (M) uses a DNS server (J) to determine where to route the data onwards. In this case the roaming hub GGSN (M) then routes the data to the destination internet/intranet environment (L).
  3) APN Routing—National Roaming type 1.
  In this architecture the handset (A) with a SIM or USIM (B) communicates via a visited national roaming 3GPP network (C) to the visited SGSN (D). The visited SGSN (D) then communicates with the multi IMSI aware HLR (F) in the home network environment (G) to determine whether the APN is allowed and where to route the data for this APN. In this case the data is routed to a GTP relay (N) in the visited network (C). The GTP relay (N) uses a DNS server (O) to determine where to route the data onwards. This is typically to a GGSN (K) in the home environment (G). The GGSN (K) then routes the data to the destination internet/intranet environment (L).

4) APN Routing—National Roaming type 2.

In this architecture the handset (A) with a SIM or USIM (B) communicates via a visited national roaming 3GPP network (C) to the visited SGSN (D). The visited SGSN (D) then communicates with the multi IMSI aware HLR (F) in the home network environment (G) to determine whether the APN is allowed and where to route the data for this APN. In this case the data is routed to a GTP relay (P) in the home network (G). The GTP relay (P) uses a DNS server (Q) to determine where to route the data onwards. This is typically to a GGSN (K) in the home environment (G). The GGSN (K) then routes the data to the destination internet/intranet environment (L).

5) APN Routing—Own network.

In this architecture the handset (A) with a SIM or USIM (B) communicates via the home 3GPP network (G) to the SGSN (R). The home SGSN (R) then communicates with the multi IMSI aware HLR (F) in the home network environment (G) to determine whether the APN is allowed and where to route the data for this APN. In this case the data is routed to a GTP relay (P) in the home network (G). The GTP relay (P) uses a DNS server (Q) to determine where to route the data onwards. This is typically to a GGSN (K) in the home environment (G). The GGSN (K) then routes the data to the destination internet/intranet environment (L).

In one embodiment, a SIM database as indicated below may be used to store IMSIs and PLMN data related to the use of the IMSI. This shows how a large quantity of information that controls the search and selection algorithm on the SIM can be store in a space-efficient manner. In conjunction with SIM application software written for this specific database design, the database stores primary search keys and optional secondary search keys. The database records also contains other information that is required by the terminal when the record is determined optimal for use by the SIM software.

| COUNTRY | MCC | MNC 1 | MNC 2 | *IMSI | *NC | | |
|---|---|---|---|---|---|---|---|
| | 2 | 2 | 2 | 1 | 1 | | 8 Bytes |
| MCC | MCC 1 | MCC 2 | MCC 3 | MCC4 | | | |
| | 0..9 | Specific | | 0 | RFU | | |
| | A | RFU | | 1 | RFU | | |
| | B | RFU | | 2 | RFU | | |
| | C | RFU | | 3 | RFU | | |
| | D | RFU | | 4 | RFU | | |
| | E | Wild? | | 5 | RFU | | |
| | F | RFU | | 6 | RFU | | |
| | | | | 7 | RFU | | |
| | | | | 8 | RFU | | |
| | | | | 9 | RFU | | |
| | | | | A | All - do not search on MNC | | |
| | | | | B | RFU | | |
| | | | | C | RFU | | |
| | | | | D | Get from Network? | | |
| | | | | E | RFU | | |
| | | | | F | Forbidden? | | |
| MNC | MNC 1 | MNC 2 | MNC 3 | MNC 4 | | | BCD in 4-bit nibbles |
| | | | | | | | nibbles |
| | 0...9 | Specific | | 0 | HPLMN | OPLMN | EHPLMN |
| | A | Pointer to #MNC list | | For specifying H/O/E only. Not for matching | | | |
| | B | RFU | | | | | |
| | C | RFU | | 1 | HPLMN | OPLMN | EHPLMN |
| | D | RFU | | For MCC + MNC matching AND H/O/E specifying | | | |
| | E | Wild | | | | | |
| | F | Padding | | If first MNC is all F then following entry is extra *IMSI | | | |
| *NC | | Offset into NC file | | | | | 1 byte |
| | | Pointer to file containing ASCII identifier appended to 'Truphone' eg 'Truphone US or Truphone NZ' | | | | | |
| *IMSI | | *IMSI | Offset into IMSI file | | | | 1 byte |
| IMSI | | IMSI | SMSc | (*)Keys | | | |
| | | 1 + 8 | 12 | 117 or 1 | | | |
| Country | | MCC | MNC 1 | MNC 2 | *IMSI | NC | 8 |
| | | MCC | MNC 1 | MNC 2 | *IMSI | NC | |
| | | MCC | MNC 1 | MNC 2 | *IMSI | NC | |
| | | MCC | MNC 1 | MNC 2 | *IMSI | NC | |

-continued

|      | MCC  | MNC 1 | MNC 2  | *IMSI   | NC  |
|------|------|-------|--------|---------|-----|
|      | MCC  | MNC 1 | MNC 2  | *IMSI   | NC  |
|      | :    |       |        |         |     |
|      | MCC  | MNC 1 | MNC 2  | *IMSI   | NC  |
| IMSI | IMSI | SMSc  | (*)Keys | 22     |     |
|      | IMSI | SMSc  | (*)Keys |        |     |
|      | :    |       |        |         |     |
|      | :    |       |        |         |     |
|      | IMSI | SMSc  | (*)Keys |        |     |
| KEYS |      | Encryption Key sets | | 117 | |
|      |      | Encryption Key sets | | | |
|      |      | :     |        |         |     |
|      |      | Encryption Key sets | | | |
| NC   | NC 1 | NC 2  |        | 2       |     |
|      | NC 1 | NC 2  |        |         |     |
|      | :    | :     |        |         |     |
|      | NC 1 | NC 2  |        |         |     |
| #MNC | MNC  |       | 4      |         |     |
|      | :    |       |        |         |     |
|      | MNC  |       |        |         |     |

COUNTRY is a proposed record structure as shown above where:
MCC contains data that the SIM application will us to match a country code returned from the handset.
MNC optionally contains operator codes data for secondary matching and/or direct xPLMN data substitution in the EF file.
It may also contain a reference (pointer) to a secondary list that contains more entries of similar information
*NC is an offset into a Database file containing text strings used for network identifier postfixes
*IMSI is an offset or pointer into a database file containing a list of IMSIs to be used for a given record selection
IMSI is the IMSI database file
KEYS is a database file of network encryption keys referenced by the (*) keys entry in the IMSI database file
MNC is an expansion for the matching or operational MNC codes used within a country When the SIM application is triggered to run from either a handset-originated event or a SIM polling mechanism indicating a change of connected network may have occurred, the SIM application searches though the database for a match based on the country code contained in the information from the handset or the polling mechanism and may match a record or optionally, records, in the database. The SIM application may optionally perform secondary matching procedures that can be repeated or nested as required as indicated by the data contained in the secondary matching records in the database records. If the SIM application determines that new operational data is required for correct operation of the terminal on the currently detected network, the SIM application may then read from the SIM database and construct and format data structures in preparation for writing said data structures to the SIM primary SIM EF data files.

The SIM EF data files may be written with the new data as determined by the SIM software at arbitrary points in time or optionally at times conditioned be but not limited to time of day, geographical location, network conditions or specific signals from the host network.

The operational data contained in the said selected database record may optionally contain primary data or links or pointers, optionally nested, to additional operational data contained other SIM database files.

Optionally the embodiment may contain default or fall-through data stores for use in the condition that a match of a specific record is not made by the SIM algorithm.

The database is flexible to optionally allow matching and selection based on but not limited to country, geographical regions consisting of several countries, networks within countries or geographical regions and may optionally use condition such as but not limited to time, date, geographical information, GPS data, network conditions or specific signals from the host network.

The data contained in the database may be optionally used for determining the PLMN to preferentially connect to, prevent connection to or actively disconnect from PLMNs The SIM database may optionally be pre-loaded at manufacture, or modified by OTA information sent from the host system.

The term territory used herein is intended to mean any specific locality, this may be in terms of countries, regions and possible even for given networks.

The terms mobile phone, handset, mobile terminal, communications device may be considered as being interchangeable within this document.

A person skilled in the art will appreciate that the present invention is not limited to details of the described embodiments, rather numerous changes and modifications may be made without departing from the spirit and scope of the invention as set out in the appended claims.

The invention claimed is:

1. A method for managing the automatic connection of a subscribed communication device to a network while roaming, the method comprising:
   determining a current location for the subscribed communication device;
   retrieving a master list of networks for that current location, wherein the master list of networks relates to networks accessible to a plurality of subscriber network identifiers available to the subscribed communication device;
   selecting a preferred network from the master list of networks and a suitable subscriber network identifier for the preferred network; and
   outputting an instruction for the subscribed mobile device to connect to the preferred network using the suitable subscriber network identifier;
   wherein the selecting step for the suitable subscriber network identifier comprises, at a central server receiving notification relating to a change in a current location for the subscribed communication device, determining from the notification whether a new subscriber network identifier is to be provisioned from the central server, and if so selecting a subscriber network identifier on the basis of the preferred network and the current location and outputting the selected subscriber network identifier to the subscribed communication device.

2. The method of claim 1, further comprising monitoring location updates for the subscribed communication device;
determining if current network is preferred network, on the basis of network selection rules.

3. The method of claim 2, further comprising instructing the subscribed communication device to disconnect from current network if determined to be not the preferred network;
instructing the subscribed communication device to reconnect to the preferred network.

4. The method of claim 1, wherein the determining step comprises determining the current location on the basis of the physical location of the subscribed communication device as determined using global positioning systems.

5. The method of claim 1, wherein the determining step comprises determining the current location on the basis of the one or more of the group comprising: Network Country/Operator ID; GSM (Cellular) Cell ID; WiFi access point ID; and other fixed radio network location identifiers.

6. The method of claim 1, wherein the selecting step comprises selecting a preferred theoretical network from the master list of networks known to be available in a certain locality of the current location.

7. The method of claim 1, wherein the selecting step comprises selecting a preferred network on the basis of the networks which the subscribed communication device determines are currently available.

8. The method of claim 1, wherein the method is carried out on the subscribed communication device, the method further comprising receiving an updated master list of networks from the central server.

\* \* \* \* \*